United States Patent
Takahashi

(10) Patent No.: US 9,408,278 B2
(45) Date of Patent: Aug. 2, 2016

(54) LIGHT-EMITTING CIRCUIT WITH VARIABLE RESISTOR ELEMENT, AND LIGHT-EMITTING MODULE AND ILLUMINATION DEVICE INCLUDING THE SAME

(71) Applicant: Panasonic Corporation, Osaka (JP)

(72) Inventor: Akira Takahashi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/376,571

(22) PCT Filed: Oct. 29, 2012

(86) PCT No.: PCT/JP2012/006922
§ 371 (c)(1),
(2) Date: Aug. 4, 2014

(87) PCT Pub. No.: WO2013/118208
PCT Pub. Date: Aug. 15, 2013

(65) Prior Publication Data
US 2014/0361711 A1  Dec. 11, 2014

(30) Foreign Application Priority Data
Feb. 7, 2012 (JP) ................. 2012-023785

(51) Int. Cl.
*H05B 37/02* (2006.01)
*H05B 33/08* (2006.01)

(52) U.S. Cl.
CPC ............ *H05B 37/02* (2013.01); *H05B 33/0812* (2013.01); *H05B 33/0821* (2013.01); *H05B 33/0857* (2013.01); *Y02B 20/343* (2013.01); *Y02B 20/345* (2013.01)

(58) Field of Classification Search
CPC ........... H05B 33/0815; H05B 33/0821; H05B 33/0812; H05B 33/0827
See application file for complete search history.

(56) References Cited

U.S. PATENT DOCUMENTS

2002/0047624 A1* 4/2002 Stam et al. ................... 315/291
2007/0120496 A1* 5/2007 Shimizu et al. ............ 315/169.3
(Continued)

FOREIGN PATENT DOCUMENTS

DE   102008057347 A1   5/2010
EP   2 442 624 A1     4/2012
(Continued)

OTHER PUBLICATIONS

Siliconix, FETs as Voltage-Controlled Resistors, Mar. 10, 1997.*
(Continued)

*Primary Examiner* — Tung X Le
*Assistant Examiner* — Raymond R Chai
(74) *Attorney, Agent, or Firm* — Renner, Otto, Boisselle & Sklar, LLP

(57) ABSTRACT

An LED module receives current supplied from a variable current source. The LED module includes a first LED that is connected to a variable current source, a bipolar transistor that is series-connected to the first LED and has a resistance that varies depending on magnitude of the current $I_t$ supplied from the variable current source, and a second LED that is parallel-connected to a series circuit that is composed of the first LED and the bipolar transistor and differs in luminescent color from the first LED.

11 Claims, 17 Drawing Sheets

(56) References Cited

U.S. PATENT DOCUMENTS

| | | | |
|---|---|---|---|
| 2010/0109537 A1 | 5/2010 | Nishino et al. | |
| 2010/0157583 A1 | 6/2010 | Nakajima | |
| 2010/0164498 A1* | 7/2010 | Helvoort et al. | 324/322 |
| 2011/0210675 A1 | 9/2011 | Hamamoto et al. | |
| 2011/0227504 A1* | 9/2011 | Kim | H05B 33/0818 315/294 |
| 2011/0291129 A1 | 12/2011 | Wirth | |
| 2015/0289336 A1* | 10/2015 | Cho | H05B 33/0848 315/192 |

FOREIGN PATENT DOCUMENTS

| | | | | |
|---|---|---|---|---|
| JP | 2001-209049 A | | 8/2001 | |
| JP | 2001209049 | * | 8/2001 | H01L 33/00 |
| JP | 2008-130523 A | | 6/2008 | |
| JP | 2009-009782 A | | 1/2009 | |
| JP | 2010-147318 A | | 7/2010 | |
| JP | 2011-198821 A | | 10/2011 | |
| JP | 2012-022980 A | | 2/2012 | |
| KR | 20010102062 | * | 9/2011 | H01L 33/48 |
| KR | 20110102062 A | * | 9/2011 | |
| WO | WO 2010/122463 A1 | | 10/2010 | |
| WO | WO 2010/143362 A1 | | 12/2010 | |
| WO | WO 2011/110981 A2 | | 9/2011 | |

OTHER PUBLICATIONS

International Search Report and Written Opinion for corresponding International Application No. PCT/JP2012/006922 mailed Jan. 29, 2013.

Extended European Search Report for corresponding European application No. EP12867868.7 dated Dec. 22, 2015.

* cited by examiner

LIGHT-EMITTING CIRCUIT WITH VARIABLE RESISTOR ELEMENT, AND LIGHT-EMITTING MODULE AND ILLUMINATION DEVICE INCLUDING THE SAME

TECHNICAL FIELD

The present invention relates to a light-emitting circuit including light-emitting elements such as light-emitting diodes (LEDs), a light-emitting module, and an illumination apparatus including the light-emitting module.

BACKGROUND ART

Conventionally, illumination apparatuses having a dimming function have been widely used. For example, an illumination apparatus using an incandescent bulb is dimmed by varying magnitude of current flowing through a filament that is a light source. By the way, when the incandescent bulb is dimmed from the dark state to the bright state, a luminescent color of the incandescent bulb varies from the orange color to the white color. This is because the luminescent color of the incandescent bulb varies depending on temperature and so on of the filament, and as the temperature of the filament decreases, color temperature of light emitted from the incandescent bulb decreases. Note that the temperature of the filament varies depending on magnitude of the current flowing through the filament.

On the other hand, there have recently been widespread, as alternatives to incandescent bulbs, illumination apparatuses using a light-emitting module having semiconductor light-emitting elements such as LEDs. Generally, a luminescent color of LED chips does not vary depending on magnitude of current flowing therethrough. This is because the luminescent color of the LED chips depends, not on the magnitude of the current, but on the band gap of semiconductor materials of the LED chips. For this reason, in the case where a lamp using LEDs as a light source (hereinafter, referred to simply as LED lamp) is used as an alternative to a incandescent bulb for an illumination apparatus having the dimming function, a user might feel discomfort about a luminescent color of the LED lamp during dimming.

By the way, Patent Literature 1 has proposed an LED module whose luminescent color is variable. In an LED module 901 as shown in FIG. 17, red LEDs 921a, 921b, 921c, 921d, 921e, and 921f (hereinafter, referred to collectively as red LEDs 921) parallel-connected to white LEDs 922a, 922b, 922c, and 922d (hereinafter, referred to collectively as white LEDs 922). Also, the white LEDs 922 are series-connected to a bipolar transistor 924. A base terminal of the bipolar transistor 924 is connected to a variable voltage source 927 via a base resistor 925. Also, a collector terminal of the bipolar transistor 924 is connected to an anode terminal of the white LED 922d. Furthermore, an emitter terminal of the bipolar transistor 924 is connected to a resistor element 926.

The LED module 901 is connected to a variable current source 933. AC power supplied from an AC power source 931 is AC/DC converted by an AC/DC converter 932, and DC power is supplied to a variable current source 933. As a result, the LED module 901 receives current supplied from the variable current source 933.

In the LED module 901, magnitude of base current of the bipolar transistor 924 varies in accordance with variation of magnitude of base-emitter voltage of the bipolar transistor 924. Here, as the magnitude of the base current increases, the magnitude of collector current of the bipolar transistor 924 increases. As a result, magnitude of current flowing through the white LEDs 922 increases. By increasing a magnitude ratio of the current flowing through the white LEDs 922 to current flowing through the red LEDs 921, a luminescent color of the LED module 901 approaches the orange color. Note that in order to vary the luminescent color of the LED module 901 in accordance with dimming, it is necessary to appropriately designate the base-emitter voltage of the bipolar transistor 924.

CITATION LIST

Patent Literature

[Patent Literature 1] Japanese Patent Application Publication No. 2009-09782

SUMMARY OF INVENTION

Technical Problem

According to Patent Literature 1, by the way, a signal line is necessary for appropriately designating voltage to be applied to a variable resistor element, in addition to a current supply line through which current is supplied from the variable current source. In response to this, there has been a demand for varying a luminescent color of a light-emitting module in accordance with dimming, with use of another configuration in which a signal line which is other than the current supply line is not provided.

The present invention aims to provide an illumination apparatus capable of varying a luminescent color of a light-emitting module in accordance with dimming without using any signal line that is different from a current supply line.

Solution to Problem

In order to achieve the above aim, the present invention provides a light-emitting circuit that receives current supplied from a variable current source, the light-emitting circuit comprising: a first light-emitting element that is connected to the variable current source; a variable resistor element that is series-connected to the first light-emitting element, and has a resistance that varies depending on magnitude of the current supplied from the variable current source; and a second light-emitting element that is parallel-connected to a series circuit composed of the first light-emitting element and the variable resistor element, and differs in luminescent color from the first light-emitting element.

Advantageous Effects of Invention

With the above configuration, as the magnitude of the current supplied from the variable current source varies, the resistance of the variable resistor element, which is series-connected to the first light-emitting elements, varies. Accordingly, as the magnitude of the current supplied from the variable current source varies, the magnitude ratio of the current flowing through the first light-emitting element to the current flowing through the second light-emitting element varies. As a result, luminance of the first light-emitting element and luminance of the second light-emitting element vary. This varies the luminescent color of the light-emitting module. Therefore, it is possible to vary a luminescent color of a light-emitting module in accordance with dimming without using any signal line that is different from a current supply line.

BRIEF DESCRIPTION OF DRAWINGS

FIG. 15A shows variation of voltage VCC output from a voltage regulator, and FIG. 15B shows magnitude of current $I_f$.

FIG. 16A shows a magnitude ratio of current flowing through an LED module, and FIG. 16B shows brightness of the LED module.

DESCRIPTION OF EMBODIMENTS

Embodiment 1

1. Overall Configuration

The following describes an LED module relating to Embodiment 1 with reference to the drawings.

Figure 1A:
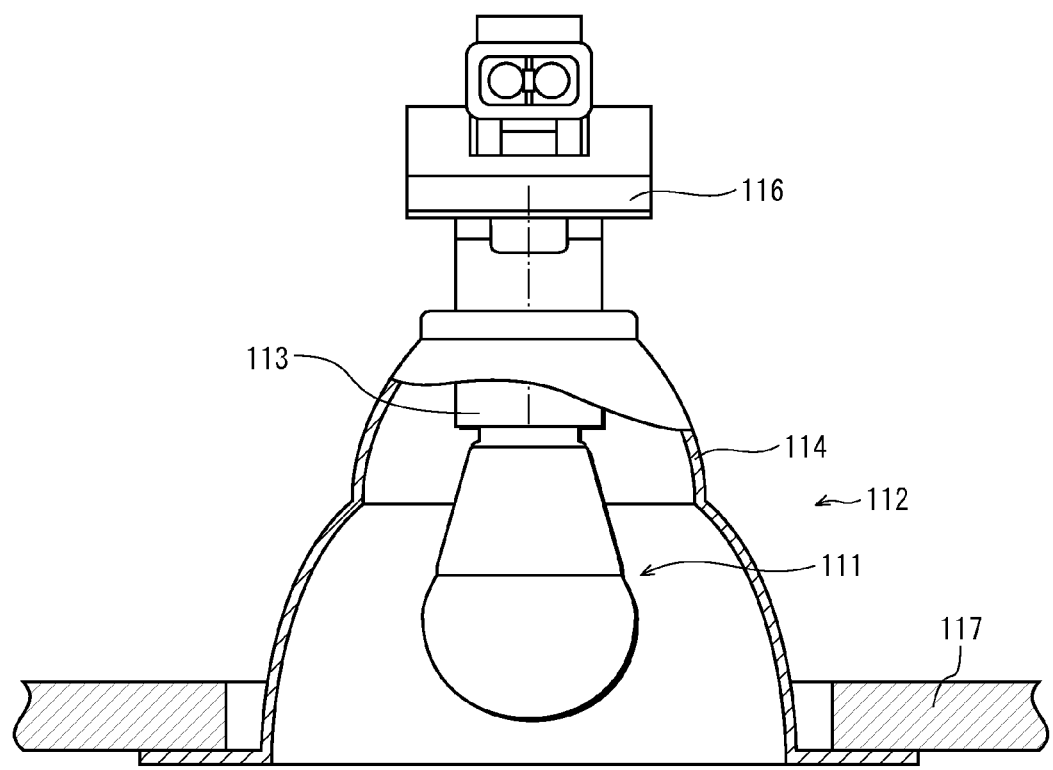
FIG. 1A is a cross-sectional view of an illumination apparatus including an LED module relating to Embodiment 1.
Figure 1B:
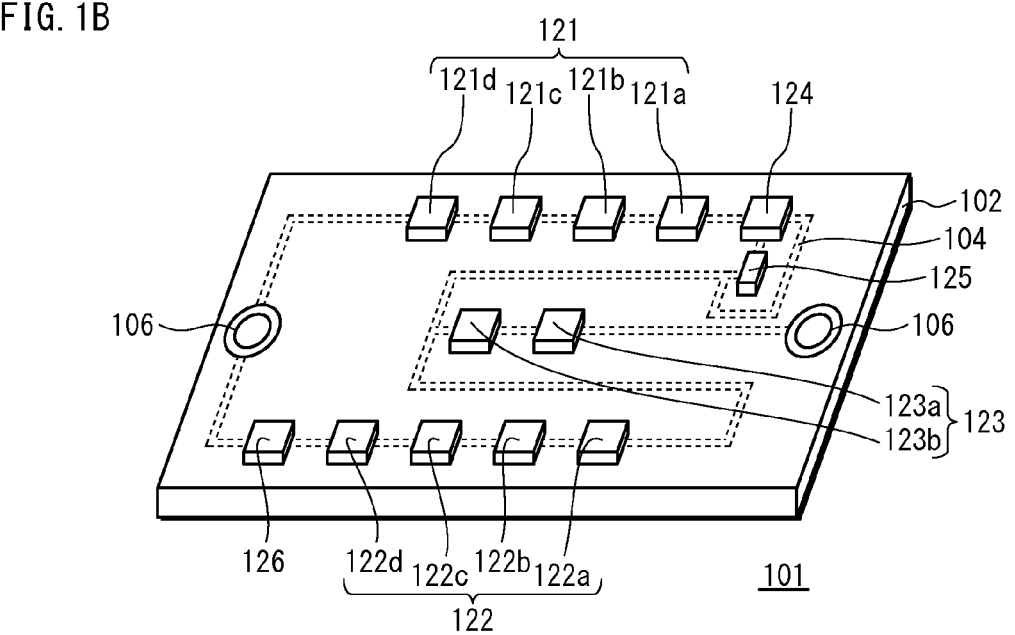
FIG. 1B is a perspective view of the LED module included in the illumination apparatus shown in FIG. 1A.

FIG. 1A is a cross-sectional view of an illumination apparatus including the LED module relating to Embodiment 1. FIG. 1B is a perspective view of the LED module included in the illumination apparatus shown in FIG. 1A.

As shown in FIG. 1A, an LED lamp 111 including an LED module is for example installable in an illumination apparatus 112 that is a so-called downlight.

The illumination apparatus 112 includes a socket 113 and a reflector plate 114. The socket 113 is electrically connected to the lamp 111, and holds the lamp 111. The reflector plate 114 is conical, and reflects light emitted from the lamp 111 in a predetermined direction. A dimmer varies output voltage which has been phase-controlled so as to vary magnitude of current supplied to the LED module, and thereby dims the lamp 111.

The illumination apparatus 112 is connected to an external commercial power source via a connecting part 116. The reflector plate 114 is attached to a ceiling 117 while the reflector plate 114 is in abutment with the periphery of an opening on a lower surface of the ceiling 117. The socket 113 is provided on the bottom of the reflector plate 114, and is positioned on an opposite side to the ceiling 117.

Note that the configuration of the illumination apparatus 112 shown in FIG. 1A is just an example, and is not limited to the downlight as described above.

As shown in FIG. 1B, an LED module 101 includes a mounting substrate 102, white LEDs 121a, 121b, 121c, and 121d (hereinafter, referred to collectively as white LEDs 121), red LEDs 122a, 122b, 122c, and 122d (hereinafter, referred to collectively as red LEDs 122) that differ in luminescent color from the white LEDs 121, white LEDs 123a and 123b (hereinafter, referred to collectively as white LEDs 123), a bipolar transistor 124 that is a variable resistor element, a base resistor element 125 that is connected to the bipolar transistor 124, and a balance resistor element 126. The white LEDs 121 and 123 are each composed of a blue LED chip and a sealing member containing a yellow phosphor. The red LEDs 122 are each composed of a blue LED chip and a sealing member containing a red phosphor and a green phosphor. The sealing member is for example constituted from a translucent material such as silicone resin and a phosphor. Although the respective numbers of the white LEDs 121, the red LEDs 122, and the white LEDs 123 are four, four, and two in the present embodiment, the respective numbers of these LEDs are not limited to these numerical values. Also, the respective colors of the LEDs are not limited to the red and white colors. Alternatively, the respective colors of the LEDs may be other colors such as the blue and green colors.

The mounting substrate 102 has a wiring pattern 104 formed thereon such that the white LEDs 121 and 123 and the red LEDs 122 are connected to each other. The mounting substrate 102 has through-holes 106 formed therethrough. A wiring connected to the white LEDs 121 and 123, the LEDs 122, and so on is connected to a circuit unit that is provided inside the lamp 111 shown in FIG. 1A via the through-holes 106. Note that the wiring is fixed to the mounting substrate 102 by soldering the wiring to the through-holes 106.

2. Electrical Connection of LED Module 101

Figure 2:
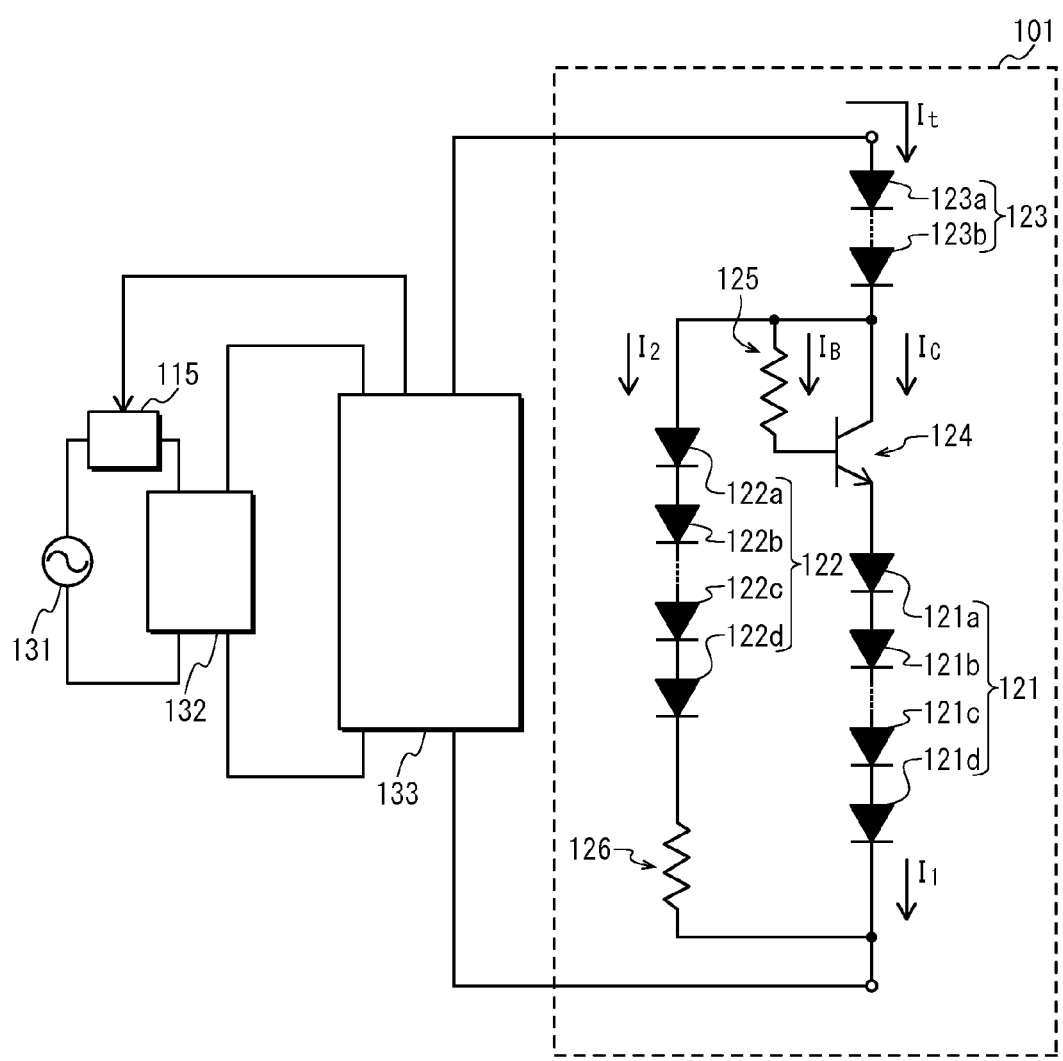
FIG. 2 is a circuit diagram of the LED module shown in FIG. 1B.

FIG. 2 is a circuit diagram of the LED module 101 shown in FIG. 1B.

The white LEDs 121 are series-connected to the bipolar transistor 124. The red LEDs 122 are parallel-connected to a series circuit that is composed of the white LEDs 121 and the bipolar transistor 124.

The LED module 101 further includes the base resistor element 125 that is series-connected to a cathode terminal of the white LED 121a and the balance resistor element 126 that is series-connected to a cathode terminal of the red LED 122d.

The bipolar transistor 124 is for example an NPN bipolar transistor that has three terminals including a base terminal that is a control terminal. The base terminal of the bipolar transistor 124 is connected to an anode terminal of the red LED 122a and a collector terminal of the bipolar transistor 124 via the base resistor element 125. The collector terminal of the bipolar transistor 124 has a higher potential. More specifically, the collector terminal of the bipolar transistor 124 is connected to a variable current source 133 via the white LEDs 123. An emitter terminal of the bipolar transistor 124 has a lower potential. More specifically, the emitter terminal of the bipolar transistor 124 is connected to an anode terminal of the white LED 121a. A cathode terminal of the white LED 121d is connected to the cathode terminal of the red LED 122d via the balance resistor element 126.

The LED module 101 is connected to an AC power source 131, a rectifying and smoothing circuit 132 for converting AC voltage to DC voltage, and the variable current source 133. The AC power source 131 is connected to the rectifying and smoothing circuit 132 via a dimmer 115. Magnitude of voltage input to the rectifying and smoothing circuit 132 varies in accordance with variation of ON phase by the dimmer 115 in response to a dimming operation. The dimming operation is performed for example by a user operating a dimming device or the like that is placed on a wall. In this way, magnitude of current $I_t$ supplied from the variable current source 133 varies depending on the magnitude of the voltage which has been phase-controlled by the dimmer 115. The variable current source 133 includes an IC and a voltage regulator for driving the IC. Driving the IC causes continuous variation of the magnitude of the current $I_t$ supplied from the variable current source 133. Note that the bipolar transistor 124 has characteristics that a resistance between the collector terminal and the emitter terminal varies in accordance with a control signal acquired from the base terminal which is a control terminal, namely, the magnitude of the current supplied from the variable current source 133 here.

3. Current Path of LED Module 101

AC output from the AC power source 131 is converted to DC by the rectifying and smoothing circuit 132. Then, the current $I_t$ whose magnitude that depends on the magnitude of the output voltage which has been phase-controlled by the dimmer 115, is supplied from the variable current source 133, as described above. The current $I_t$, which is supplied from the variable current source 133, flows through the white LEDs 123.

The current $I_t$, which flows through the white LEDs 123, is separated to collector current $I_C$ flowing from the collector terminal to the emitter terminal, base current $I_B$ flowing the base resistor element 125 to the base terminal, and current $I_2$ flowing to the red LEDs 122. Current $I_1$ flowing through the white LEDs 121 is equivalent to the sum of the collector current $I_C$ and the base current $I_B$. The white LEDs 121, the red LEDs 122, and the white LEDs 123 respectively light emit at luminance in accordance with the currents $I_1$, $I_2$, and $I_t$.

4. Characteristics and Control of LED Module 101

Figure 3A:
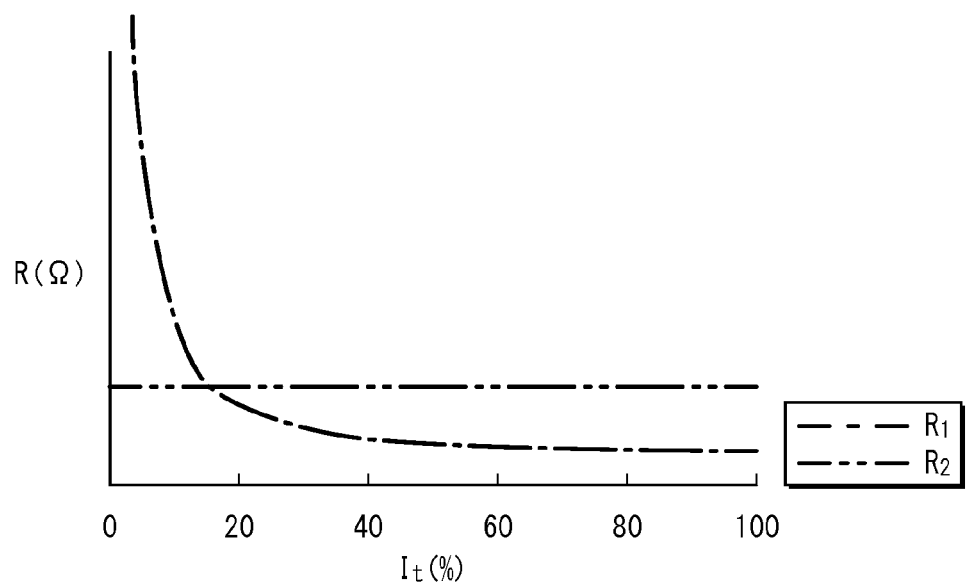
FIG. 3A shows respective resistances of a bipolar transistor and a resistor element that are included in the LED module shown in FIG. 1B.
Figure 3B:
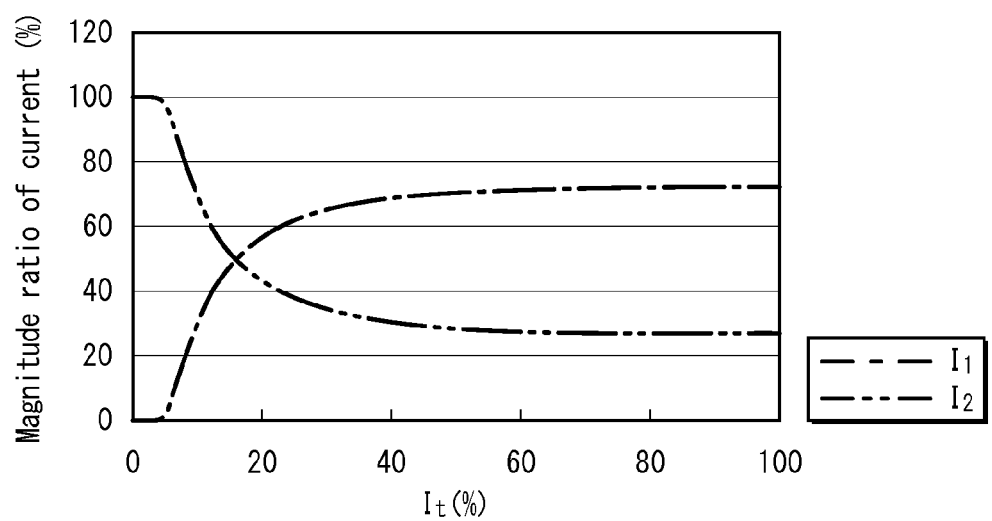
FIG. 3B is a diagram for explaining a magnitude ratio of current flowing through the LED module.

FIG. 3A shows respective resistances $R_1$ and $R_2$ of the bipolar transistor 124 and the balance resistor element 126 which are included in the LED module 101. FIG. 3B is a diagram for explaining a magnitude ratio of the current $I_1$ flowing through the white LEDs 121 to the current $I_2$ flowing through the red LEDs 122. Here, the current $I_t$ of 100% indicates a current value of current supplied from the variable current source 133 at the design maximum luminance of the LED module 101. Note that numerical values and shapes shown in graphs in FIG. 3A and FIG. 3B are just examples.

In a graph in FIG. 3A, the horizontal axis represents the current value of the current supplied from the variable current source 133, and the vertical axis represents the respective resistances $R_1$ and $R_2$ of the bipolar transistor 124 and the balance resistor element 126.

As shown in FIG. 3A, as the magnitude of the current $I_t$ supplied from the variable current source 133 increases, the resistance $R_1$ of the bipolar transistor 124 decreases. Compared with this, the resistance $R_2$ of the balance resistor element 126 is constant irrespective of the increase of the magnitude of the current $I_t$ supplied from the variable current source 133. Specifically, when the current $I_t$ of lower than 17% is supplied, the resistance $R_1$ of the bipolar transistor 124 is higher than the resistance $R_2$ of the balance resistor element 126. When the current $I_t$ of 17% is supplied, the resistance $R_1$ of the bipolar transistor 124 is equal to the resistance $R_2$ of the balance resistor element 126. When the current $I_t$ of higher than 17% is supplied, the resistance $R_1$ of the bipolar transistor 124 is lower than the resistance $R_2$ of the balance resistor element 126.

This clarifies a relationship between the magnitude of the current $I_t$ supplied from the variable current source 133, the resistance $R_1$ of the bipolar transistor 124, and the resistance $R_2$ of the balance resistor element 126.

In a graph in FIG. 3B, the horizontal axis represents the magnitude of the current $I_t$ supplied from the variable current source 133, and the vertical axis represents a magnitude ratio of the current flowing through each of the current paths to the current $I_t$. In the graph, $I_1$ represents the current flowing through the white LEDs 121, and $I_2$ represents the current flowing through the red LEDs 122.

As shown in FIG. 3B, when the current $I_t$ of lower than 17% is supplied, the magnitude of the current $I_1$ flowing through the white LEDs 121 is lower than the magnitude of the current $I_2$ flowing through the red LEDs 122. When the current $I_t$ of 17% is supplied, the magnitude of the current $I_1$ flowing through the white LEDs 121 is equal to the magnitude of the current $I_2$ flowing through the red LEDs 122. This is because when the current $I_t$ of 17% is supplied, the resistance $R_1$ of the bipolar transistor 124 is equal to the resistance $R_2$ of the balance resistor element 126. When the current $I_t$ of higher than 17% is supplied, the magnitude of the current $I_1$ flowing through the white LEDs 121 is higher than the magnitude of the current $I_2$ flowing through the red LEDs 122. Accordingly, a luminescent color of light resulting from mixing light emitted from the white LEDs 121 and the red LEDs 122 varies as follows. When the current $I_t$ of lower than 17% is supplied, the luminescent color of the light varies from the red color to the orange color. When the current $I_t$ of 17% or higher is supplied, the luminescent color varies from the orange color to the yellowish-white color. As the supply of the current $I_r$ approaches 100%, the luminescent color approaches the white color.

In the LED module 101 as clear from FIG. 3A and FIG. 3B, the magnitude ratio of the current $I_1$ flowing through the red LEDs 121 to the current $I_2$ flowing through the red LEDs 122 varies in accordance with variation of the magnitude of the current $I_r$, which is supplied from the variable current source 133. Therefore, it is demonstrated that when the magnitude of the current $I_r$, which is supplied from the variable current source 133, varies in accordance with dimming of the lamp 111, the luminescent color varies in the same manner as incandescent bulbs.

5. Simulations

It is possible to vary the magnitude ratio of the current $I_1$ flowing through the white LEDs 121 to the current $I_2$ flowing through the red LEDs 122, by varying the resistance $R_1$ of the base resistor element 125 and the resistance $R_2$ of the balance resistor element 126. In order to analyze this, the inventor performed simulations on variation in luminescent color that occurs in accordance with variation of the resistance $R_1$ of the base resistor element 125 and the resistance $R_2$ of the balance resistor element 126.

Figure 4:
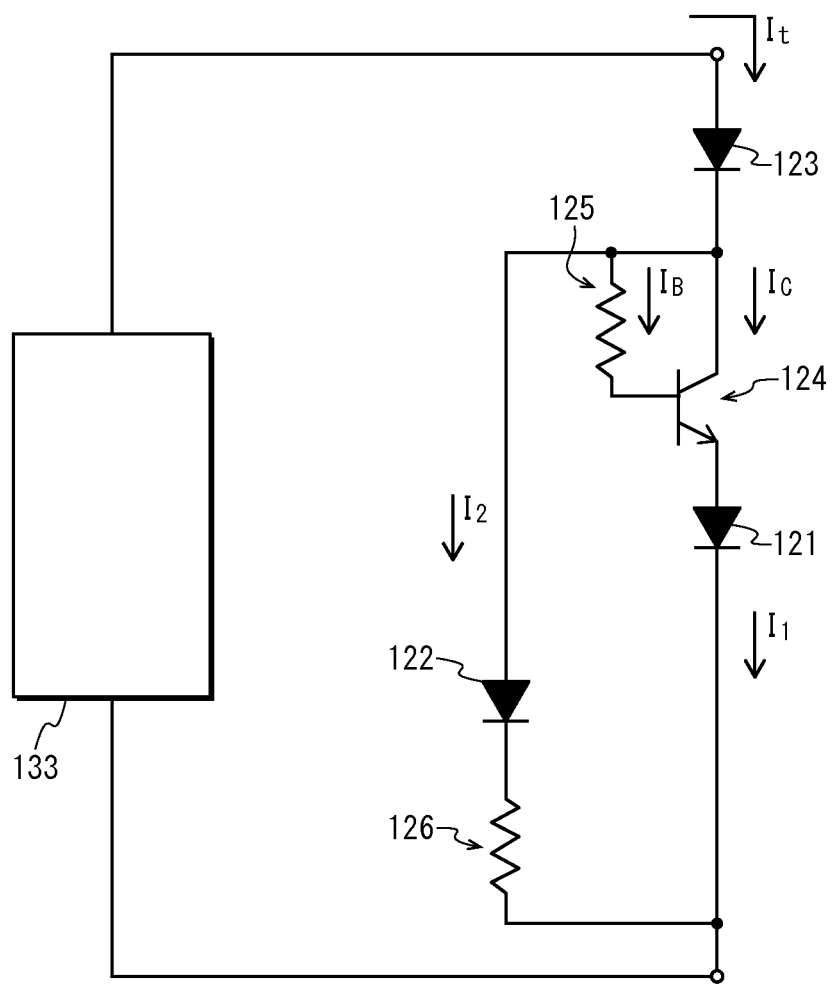
FIG. 4 is a circuit diagram of an LED module used in simulations.

FIG. 4 is a circuit diagram of an LED module used in simulations. In the simulations, the maximum current value of the current $I_r$ supplied from the variable current source 133 (the magnitude of the current $I_r$ corresponding to supply of the current $I_r$ 100%) is set to 0.05 A. FIG. 5A to FIG. 8C are graphs showing results of the simulations performed using the LED module shown in FIG. 4. In graphs in the FIG. 5A to FIG. 7C, the horizontal axis represents time, and the vertical axis represents the current value. In graphs in FIG. 6A to FIG. 8C, the horizontal axis represents the magnitude of the current $I_r$ supplied from the variable current source 133, and the vertical axis represents a magnitude ratio of the currents flowing through each of the current paths to the current $I_r$.

5-1. Influence of Resistance of Base Resistor Element

Figure 5A:
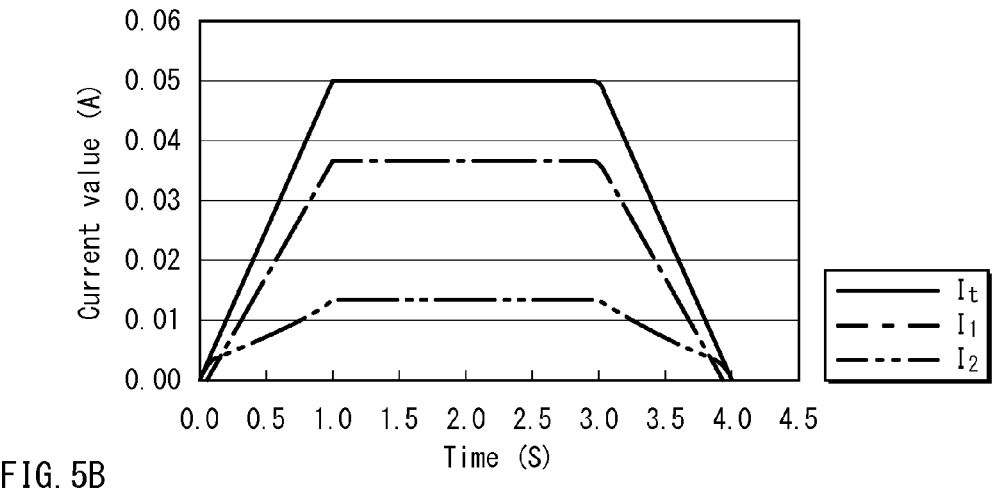
FIG. 5A to FIG. 5C show graphs of results of the simulations performed using the LED module shown in FIG. 4, and respectively correspond to resistance $R_1$ of 10 kΩ, resistance $R_1$ of 1 kΩ, and resistance $R_1$ of 30 kΩ.
Figure 5B:
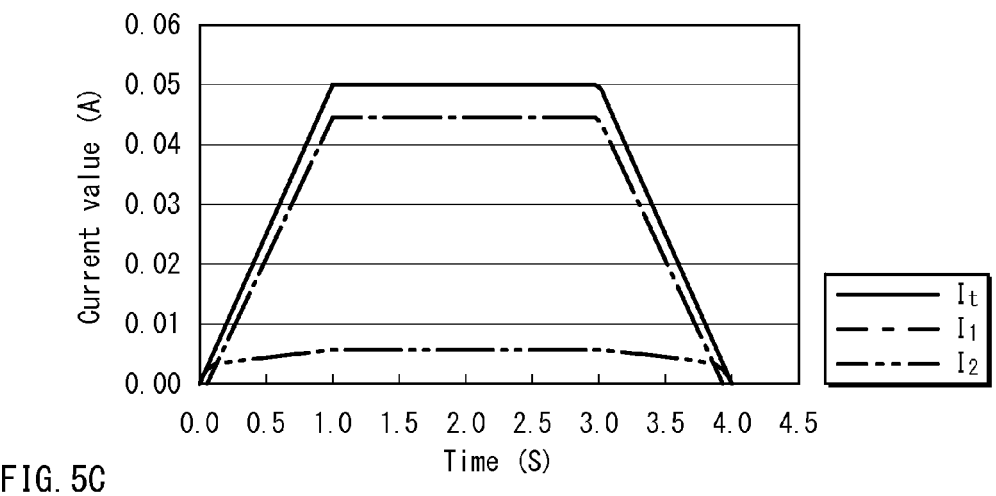
Figure 5C:
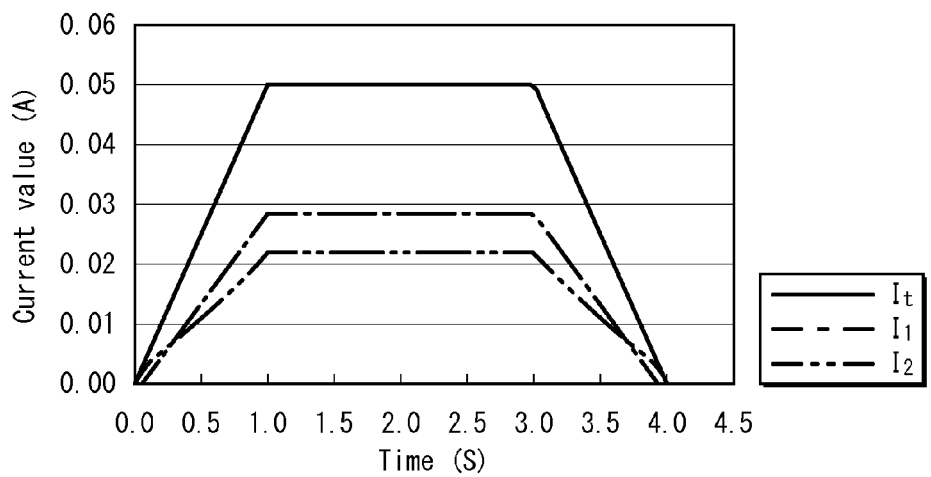
Figure 6A:
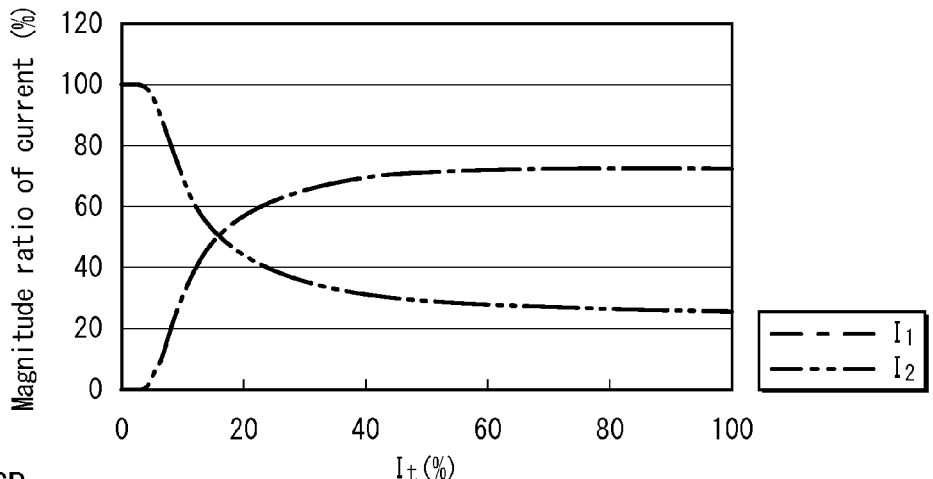
FIG. 6A to FIG. 6C show graphs of results of the simulations performed using the LED module shown in FIG. 4, and respectively correspond to resistance $R_1$ of 10 kΩ, resistance $R_1$ of 1 kΩ, and resistance $R_1$ of 30 kΩ.
Figure 6B:
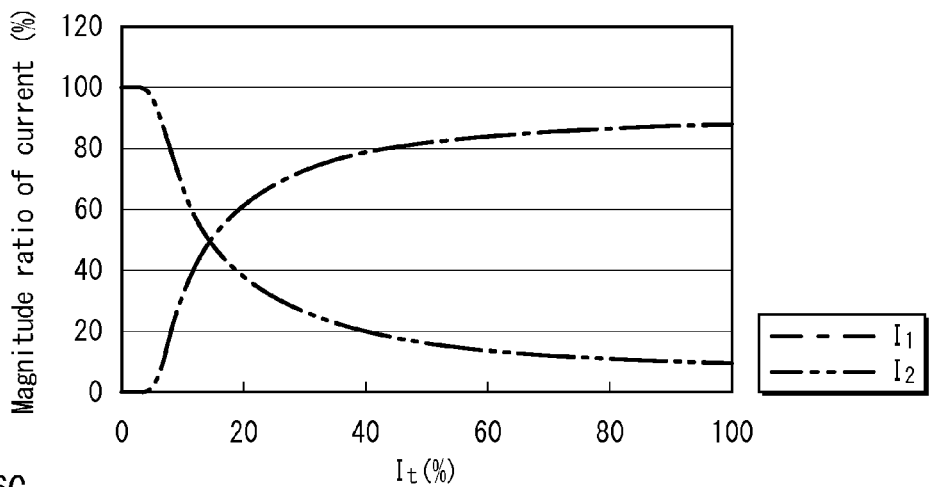
Figure 6C:
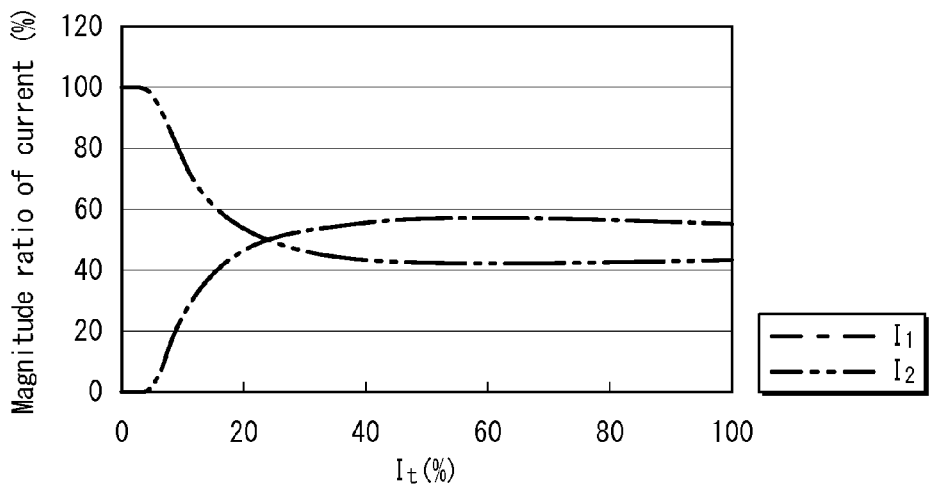

FIG. 5A to FIG. 5C show variation of the current value in accordance with variation of the resistance $R_1$ of the base resistor element 125. FIG. 6A to FIG. 6C show variation of the magnitude ratio in accordance with variation of the resistance $R_1$ of the base resistor element 125. In FIG. 5A to FIG. 6C, the graphs in FIG. 5A and FIG. 6A, the graphs in FIG. 5B and FIG. 6B, and the graphs in FIG. 5C and FIG. 6C correspond to the resistance $R_1$ of 10 kΩ, the resistance $R_1$ of 1 kΩ, and the resistance $R_1$ of 30 kΩ, respectively, and the resistance $R_2$ of the balance resistor element 126 is always 200Ω.

As shown in FIG. 5A to FIG. 5C, when the time passes from 0.0 S to 1.0 S, in other words, when the magnitude of the current $I_r$ supplied from the variable current source 133 gradually increases, the magnitude of the current $I_1$ flowing through the white LEDs 121 and the magnitude of the current $I_2$ flowing through the red LEDs 122 increase. When the time passes from 1.0 S to 3.0 S, in other words, when the magnitude of the current $I_r$ supplied from the variable current source 133 is constant, the magnitude of the current $I_1$ flowing through the white LEDs 121 and the magnitude of the current $I_2$ flowing through the red LEDs 122 are constant. When the time passes from 3.0 S to 4.0 S, in other words, when the magnitude of the current $I_r$ supplied from the variable current source 133 gradually decreases, the magnitude of the current $I_1$ flowing through the white LEDs 121 and the magnitude of the current $I_2$ flowing through the red LEDs 122 decrease.

More specifically, comparison of FIG. 5A and FIG. 5B demonstrates that when the resistance $R_1$ of the base resistor element 125 decreases, the magnitude of the current $I_1$ flowing through the white LEDs 121 increases and the magnitude of the current $I_2$ flowing through the red LEDs 122 decreases. On the other hand, comparison of FIG. 5A and FIG. 5C demonstrates that when the resistance $R_1$ of the base resistor element 125 increases, the magnitude of the current $I_1$ flowing through the white LEDs 121 decreases and the magnitude of the current $I_2$ flowing through the red LEDs 122 increases.

Also, comparison of FIG. 6A and FIG. 6B demonstrates that the resistance $R_1$ of the base resistor element 125 decreases, the magnitude ratio of the current $I_1$ flowing through the white LEDs 121 increases and the magnitude ratio of the current $I_2$ flowing through the red LEDs 122 decreases. On the other hand, comparison of FIG. 6A and FIG. 6C demonstrates that when the resistance $R_1$ of the base resistor element 125 increases, the magnitude ratio of the current $I_1$ flowing through the white LEDs 121 decreases and the magnitude ratio of the current $I_2$ flowing through the red LEDs 122 increases.

5-2. Influence by Resistance of Base Resistor Element

Figure 7A:
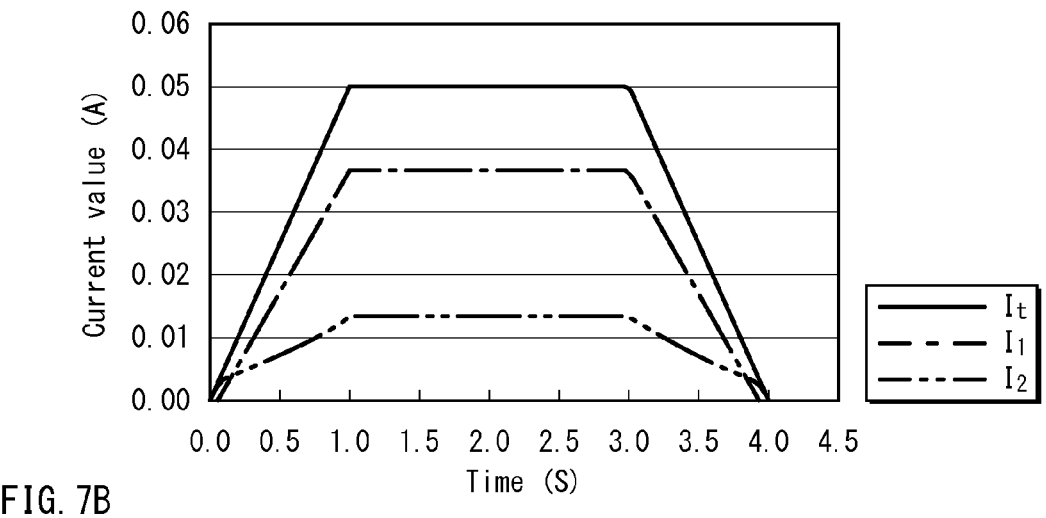
FIG. 7A to FIG. 7C show graphs of results of the simulations performed using the LED module shown in FIG. 4, and respectively correspond to resistance $R_2$ of 200Ω, resistance $R_2$ of 100Ω, and resistance $R_2$ of 400Ω.
Figure 7B:
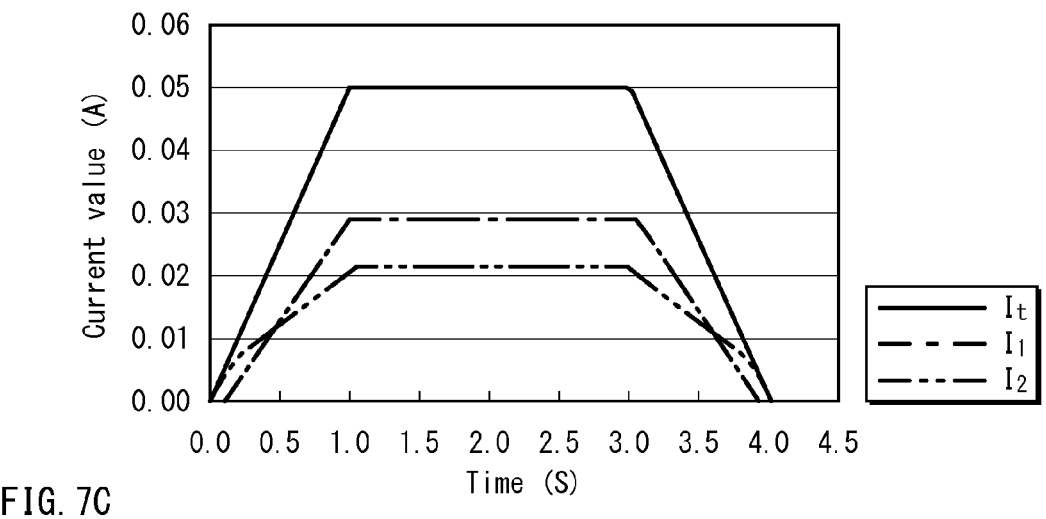
Figure 7C:
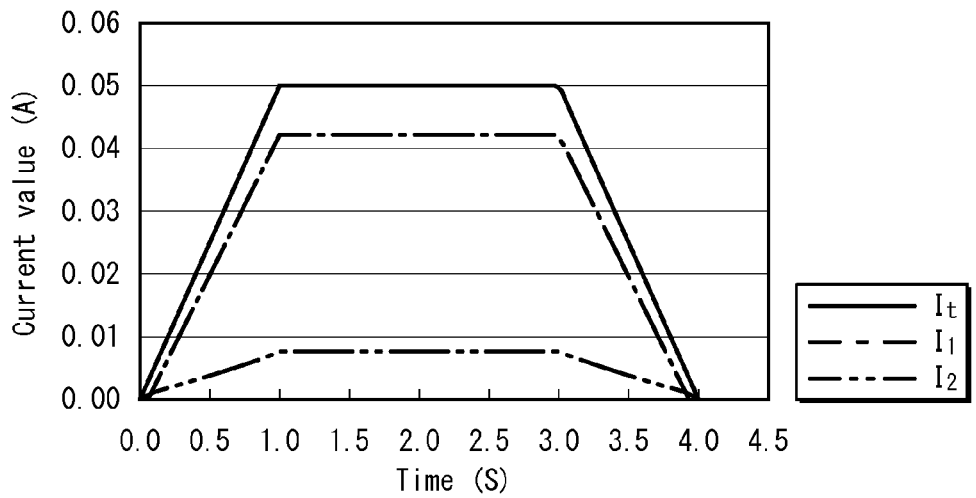
Figure 8A:
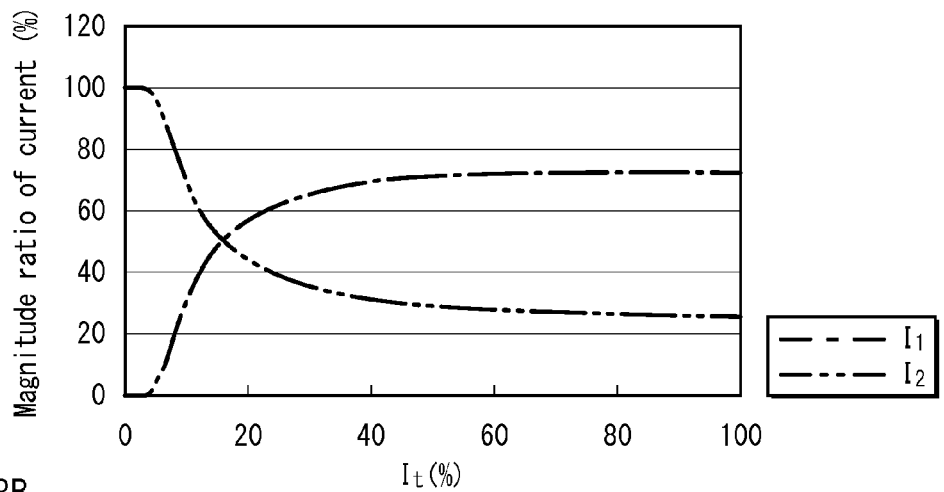
FIG. 8A to FIG. 8C show graphs of results of the simulations performed using the LED module shown in FIG. 4, and respectively correspond to resistance $R_2$ of 200Ω, resistance $R_2$ of 100Ω, and resistance $R_2$ of 400Ω.
Figure 8B:
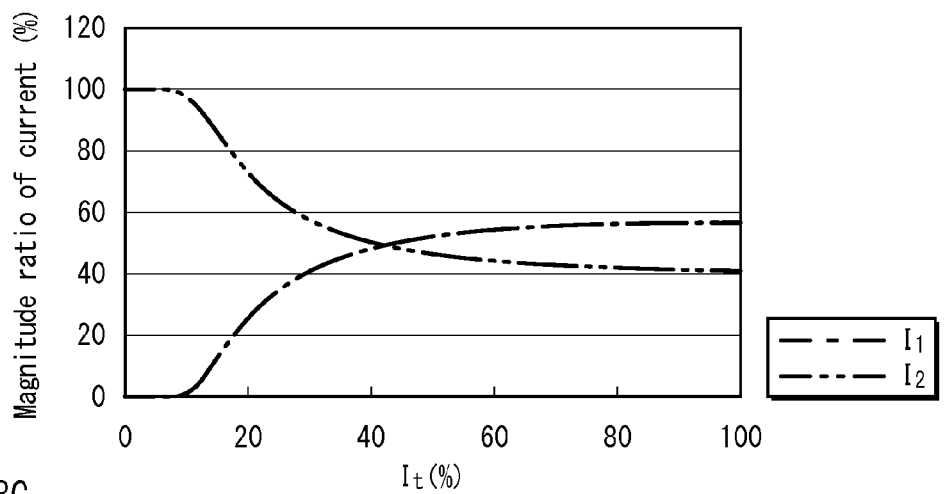
Figure 8C:
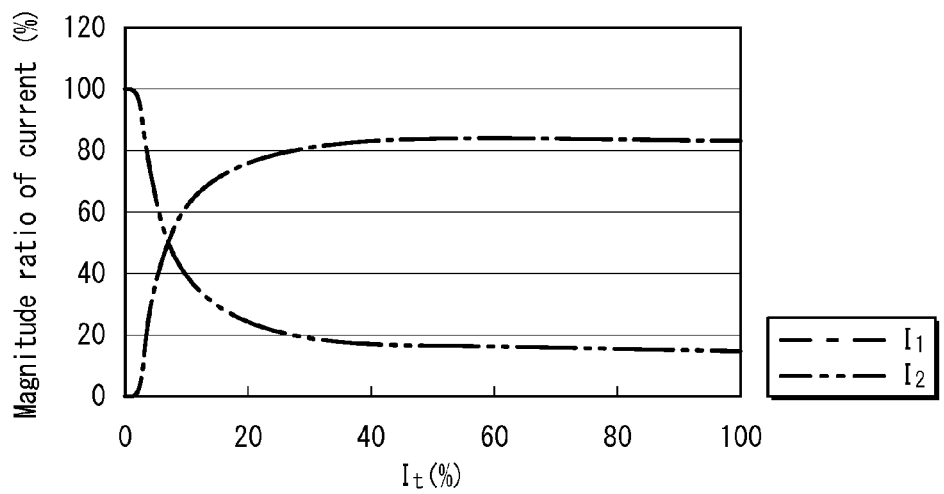

FIG. 7A to FIG. 7C show variation of the current value in accordance with variation of the resistance $R_2$ of the base resistor element 126. FIG. 8A to FIG. 8C show variation of the current value in accordance with variation of the resistance $R_2$ of the base resistor element 126. In FIG. 7A to FIG. 8C, the graphs in FIG. 7A and FIG. 8A, the graphs in FIG. 7B and FIG. 8B, and the graphs in FIG. 7C and FIG. 8C correspond to the resistance $R_2$ of 200 kΩ, the resistance $R_2$ of 100 kΩ, and the resistance $R_2$ of 400 kΩ, respectively, and the resistance $R_1$ of the base resistor element 125 is always 10 kΩ.

FIG. 7A is the same as FIG. 5A. Comparison of FIG. 7A and FIG. 7B demonstrates that when the resistance $R_2$ of the balance resistor element 126 decreases, the current $I_1$ flowing through the white LEDs 121 decreases and the current $I_2$ flowing through the red LEDs 122 increases. On the other hand, comparison of FIG. 7A and FIG. 7C demonstrates that when the resistance $R_2$ of the balance resistor element 126 increases, the current $I_1$ flowing through the white LEDs 121 increases and the current $I_2$ flowing through the red LEDs 122 decreases.

FIG. 8A is the same as FIG. 6A. Comparison of FIG. 8A and FIG. 8B demonstrates that when the resistance $R_2$ of the balance resistor element 126 decreases, the magnitude ratio of the current $I_1$ flowing through the white LEDs 121 decreases and the magnitude ratio of the current $I_2$ flowing through the red LEDs 122 increases. On the other hand, comparison of FIG. 8A and FIG. 8C demonstrates that when the resistance $R_2$ of the balance resistor element 126 increases, the magnitude ratio of the current $I_1$ flowing through the white LEDs 121 increases and the magnitude ratio of the current $I_2$ flowing through the red LEDs 122 decreases.

6. Effects

With the above configuration, the resistance $R_1$ of the bipolar transistor 124 varies depending on the magnitude of the current $I_r$ supplied from the variable current source 133. Accordingly, by varying the magnitude of the current $I_r$ supplied from the variable current source 133, it is possible to vary the magnitude ratio of the current $I_1$ flowing through the white LEDs 121 to the current $I_2$ flowing through the red LEDs 122. This varies the luminance of the white LEDs 121 and the luminance of the red LEDs 122. Therefore, it is possible to vary the luminescent color of the LED module 101 in accordance with dimming, without using any signal line that is different from the current supply line through which current is supplied from the variable current source 133.

Also, the lower the magnitude of the current $I_t$ supplied from the variable current source 133 is, the higher the magnitude ratio of the current $I_2$ flowing through the red LEDs 122 is. As a result, like incandescent bulbs, the more a lighting fixture is dimmed out, the closer to the orange color the luminescent color of the LED module becomes. Therefore, the illumination apparatus 112, which has the dimming function and the lamp 111 alternative to an incandescent bulb, reduces the discomfort feeling users have during dimming.

Moreover, in order to increase the effects of variation of the luminescent color of the lamp 11, it is effective to reduce the number of LED chips of the white LEDs 123.

Embodiment 2

The LED module relating to Embodiment 1 includes the NPN bipolar transistor having three terminals as the variable resistor element. However, the variable resistor element is not limited to the NPN bipolar transistor. Alternatively, the variable resistor element may be for example a PNP bipolar transistor, an N-channel field effect transistor (FET), or a P-channel FET.

The following describes an LED module 201 including an N-channel FET relating to Embodiment 2, with reference to the drawings.

1. Electrical Connection of LED Module 201

Figure 9:
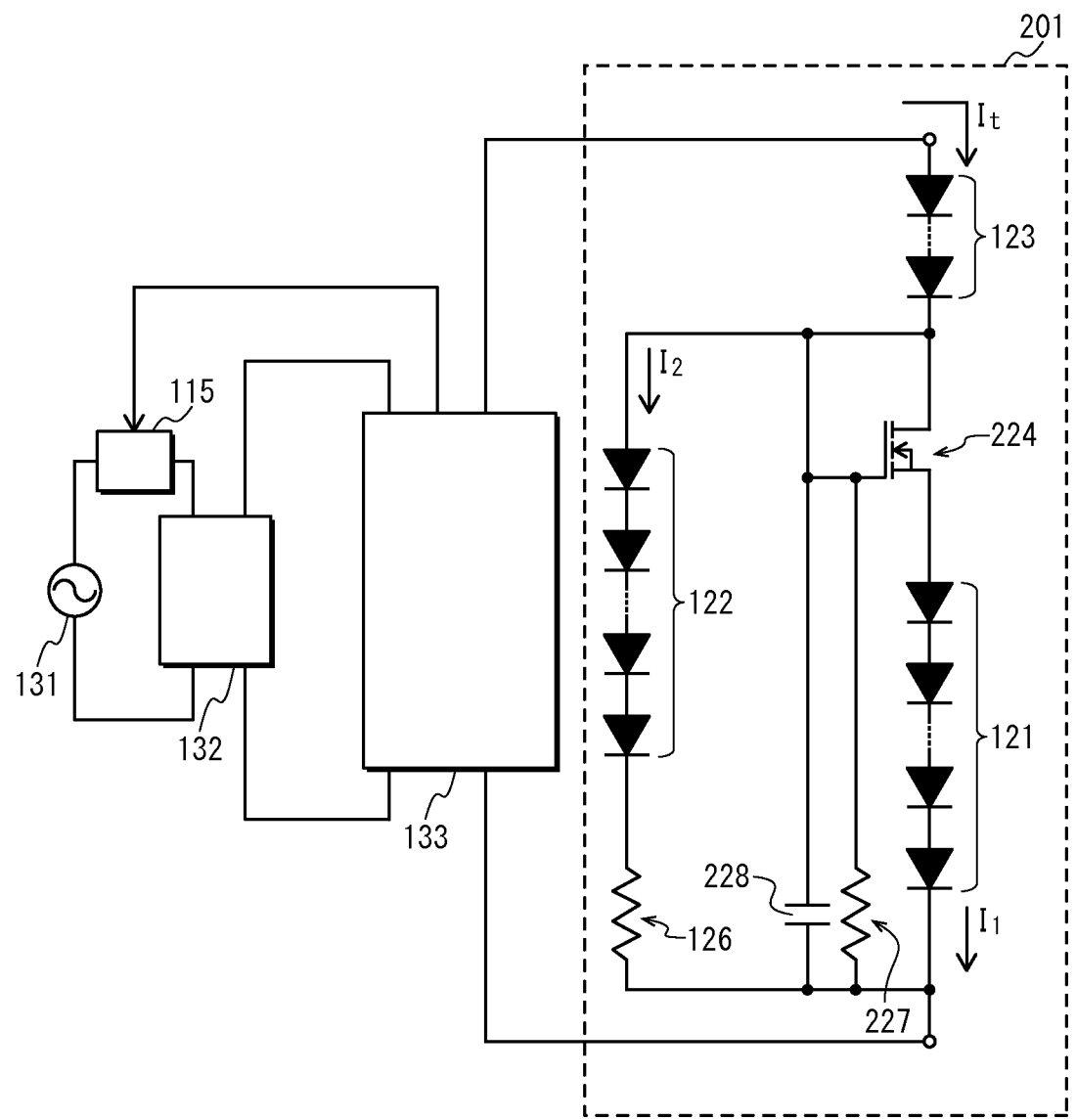
FIG. 9 is a circuit diagram of an LED module relating to Embodiment 2.

FIG. 9 is a circuit diagram of the LED module 201. The LED module 201 includes white LEDs 121 and so on, like the LED module relating to Embodiment 1. The LED module 201 basically has the same configuration as the LED module 101 except the following different points.

In the LED module 201 as shown in FIG. 9, the white LEDs 121 are series-connected to a MOS-FET 224. Also, the red LEDs 122 are parallel-connected to a series circuit that is composed of the white LEDs 121 and the MOS-FET 224.

Furthermore, the LED module 201 includes an FET resistor element 227 for varying voltage of the MOS-FET 224, a capacitor 228 that is parallel-connected to the FET resistor element 227, and a balance resistor element 126 that is connected to a cathode terminal of a red LED 122d. A gate terminal of the MOS-FET 224 is connected to the FET resistor element 227. A drain terminal of the MOS-FET 224 is provided on a higher-potential side. Specifically, the drain terminal of the MOS-FET 224 is connected to a variable current source 133 via white LEDs 123. A source terminal of the MOS-FET 224 is provided on a lower-potential side. Specifically, the source terminal of the MOS-FET 224 is connected to an anode terminal of a white LED 121a. A cathode terminal of a white LED 121d is connected to the cathode terminal of the red LED 122d via the balance resistor element 126.

When the magnitude of the current $I_t$ supplied from the variable current source 133 increases, the magnitude of the current flowing through the FET resistor element 227 increases, and as a result voltage applied to the FET resistor element 227 increases. This increases the magnitude of source-drain voltage of the MOS-FET 224, and as a result the resistance $R_1$ of the MOS-FET 224 decreases.

2. Effects

With the above configuration, the resistance $R_1$ of the bipolar transistor 224 varies depending on the magnitude of the current $I_t$ supplied from the variable current source 133. Therefore, it is possible to vary the luminescent color of the LED module 201 in accordance with dimming, without using any signal line that is different from the current supply line through which current is supplied from the variable current source 133.

Modifications

1. Modification in which Thermistor is Used

In the circuit relating to the above embodiments, the variable resistor element may be a thermistor that is an element having two terminals and having resistance varying depending on magnitude of current flowing therethrough. The following describes LED modules 301 and 401 each including a thermistor with reference to FIG. 10A and FIG. 10B, respectively. The LED modules 301 and 304 basically have the same configuration as the LED module 101 except the following different points.

1-1. PTC Thermistor

Firstly, the LED module 301 is described. The LED module 301 includes a positive temperature coefficient (PTC) thermistor whose resistance increases in accordance with increase in temperature.

Figure 10A:
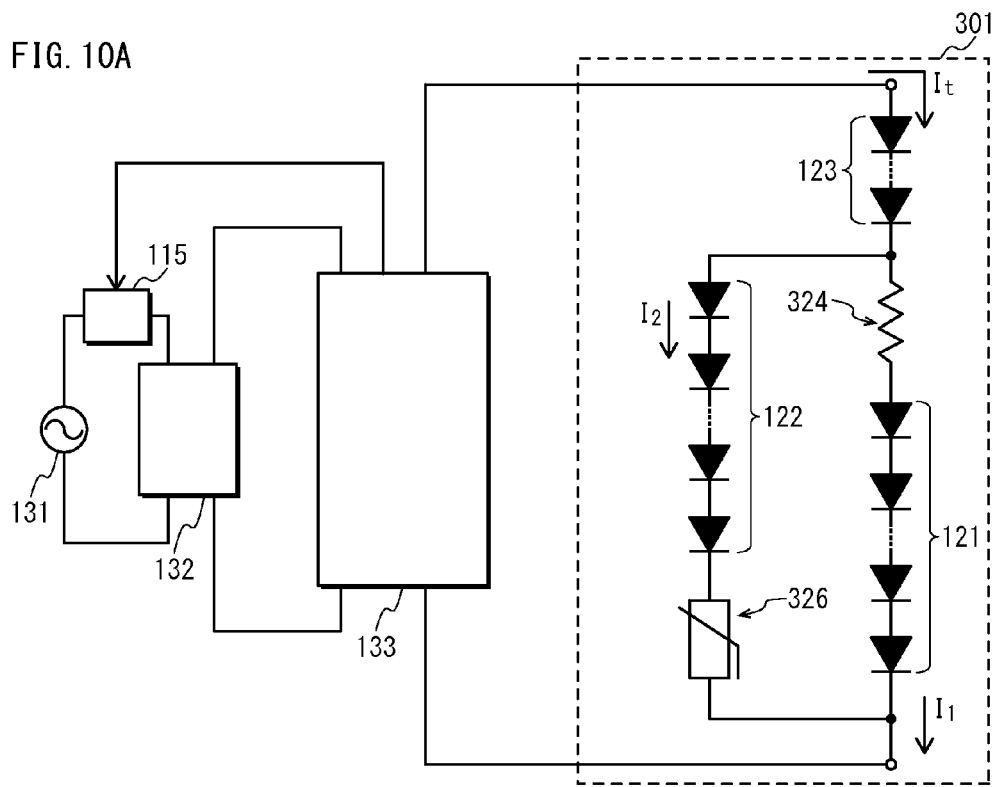
FIG. 10A is a circuit diagram of an LED module relating to a modification using a PTC thermistor.

In the LED module 301 as shown in FIG. 10A, red LEDs 122 are series-connected to a PTC thermistor 326. White LEDs 121 are parallel-connected to a series circuit that is composed of the red LEDs 122 and the PTC thermistor 326. The white LEDs 121 are connected to a balance resistor element 324. When magnitude of current flowing through the PTC thermistor 326 increases, the resistance of the PTC thermistor 326 increases due to increase in temperature thereof caused by self-heating. The PTC thermistor 326 is for example a ceramic PTC, a polymer PTC, or the like.

Resistance $R_1$ of the PTC thermistor 326 varies depending on the magnitude of the current flowing therethrough, and resistance $R_2$ of the balance resistor element 324 is constant. Accordingly, when magnitude of current $I_t$ supplied from the variable current source 133 increases, a ratio of the resistance $R_1$ of the PTC thermistor 326 to the resistance $R_2$ of the balance resistor element 324 varies. As a result, a magnitude ratio of current $I_1$ flowing through the white LEDs 121 to current $I_2$ flowing through the red LEDs 122 varies. Therefore, it is possible to vary a luminescent color of the LED module 301 by varying the magnitude of the current $I_t$ supplied from the variable current source 133.

1-2. NTC Thermistor

The following describes the LED module 401 including an negative temperature coefficient (NTC) thermistor whose resistance decreases in accordance with increase in temperature.

Figure 10B:
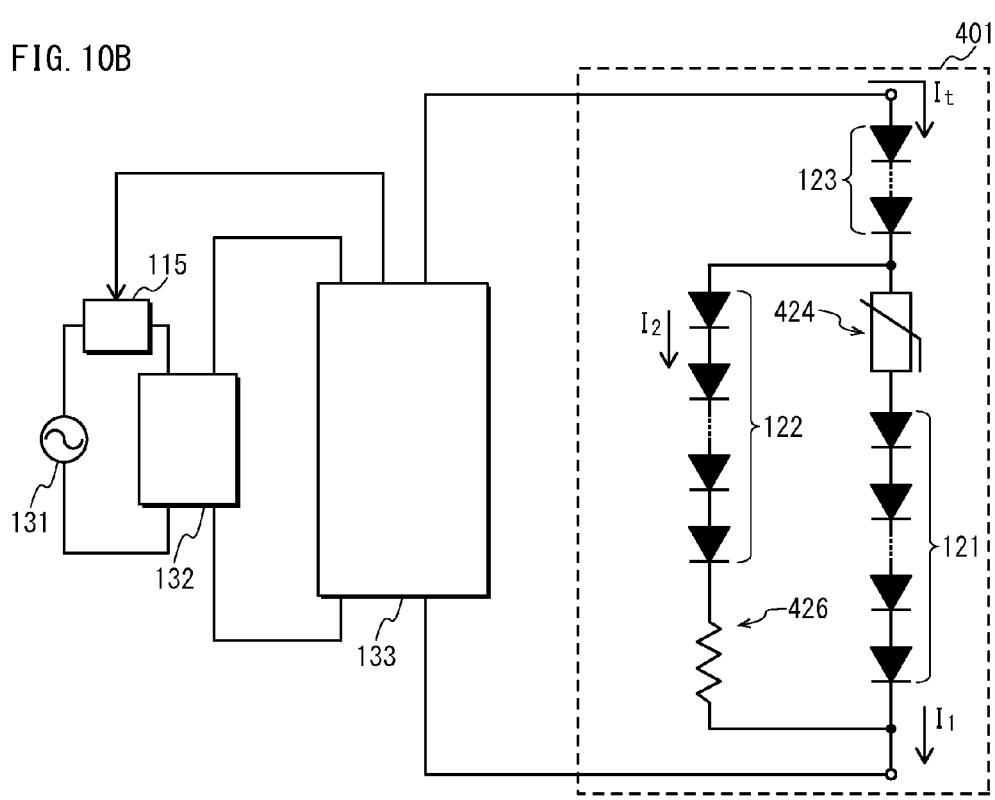
FIG. 10B is a circuit diagram of an LED module relating to a modification using an NTC thermistor.

In the LED module 401 as shown in FIG. 10B, white LEDs 121 are series-connected to an NTC thermistor 424. Red LEDs 122 are parallel-connected to a series circuit that is composed of the white LEDs 121 and the NTC thermistor 424. The red LEDs 122 are connected to a balance resistor element 426. The NTC thermistor 424 is for example a thermistor that is formed by mixing and sintering of oxide materials such as nickel, manganese, cobalt, and iron.

When magnitude of current flowing through the NTC thermistor 424 increases, the resistance of the NTC thermistor 424 decreases due to increase in temperature thereof caused by self-heating. Therefore, it is possible to vary a luminescent color of the LED module 401 by varying the magnitude of the current $I_t$ supplied from the variable current source 133, in the same manner as in the PTC thermistor 326.

2. Number of Current Paths Differing in Magnitude Ratio of Current

In the above embodiments, the two current paths which differ in magnitude ratio of current from each other are parallel-to connected to each other. However, the configuration of the current paths is not limited to this. For example, with use of an LED module having three or more current paths that differ in magnitude ratio of current from each other, it is possible to realize wide variation of the luminescent color.

Figure 11A:
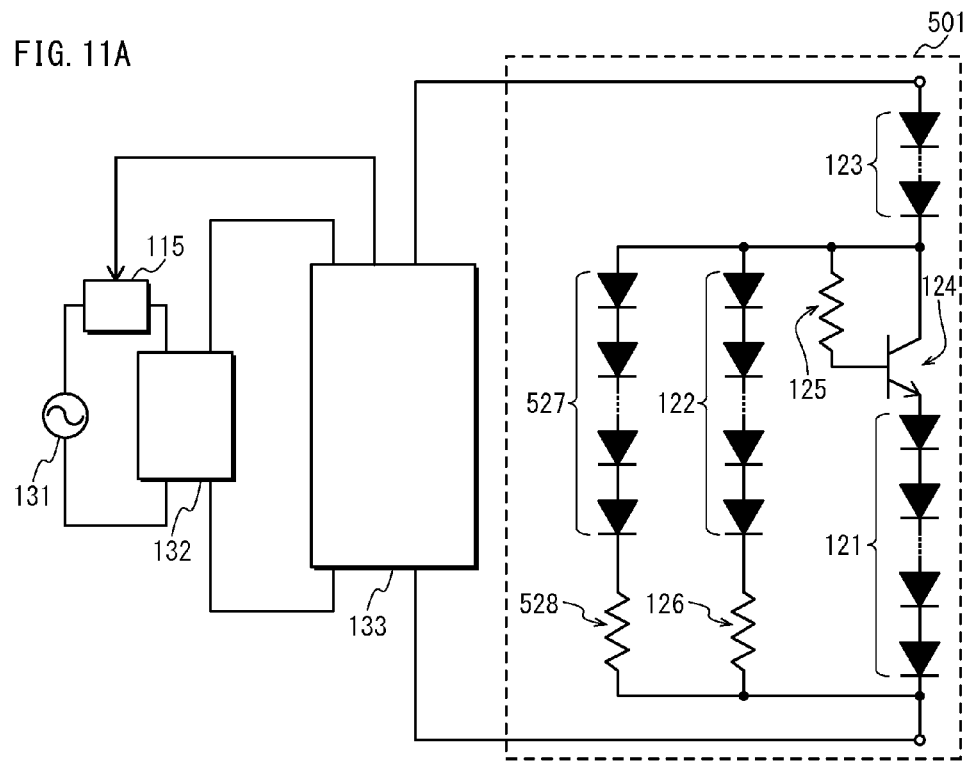
FIG. 11A is a circuit diagram of an LED module using one bipolar transistor relating to a modification.
Figure 11B:
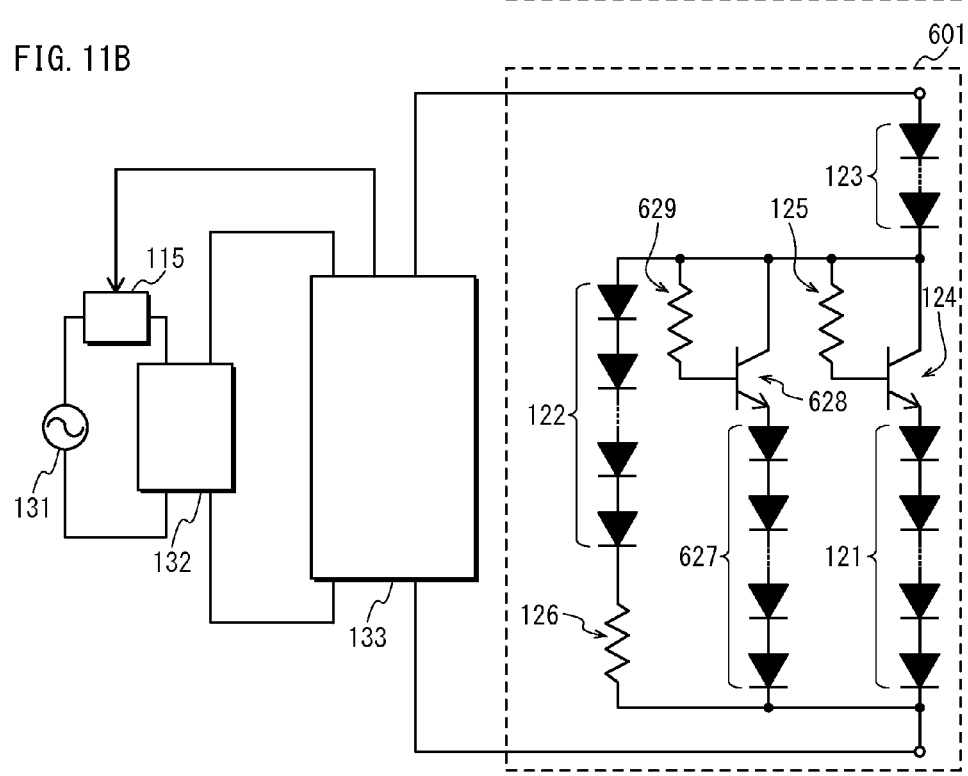
FIG. 11B is a circuit diagram of an LED module using two bipolar transistors relating to a modification.

The following describes LED modules 501 and 601 each including a bipolar transistor with reference to FIG. 11A and FIG. 11B, respectively. The LED modules 501 and 601 basically have the same configuration as the LED module 101 except the following different points.

In the LED module 501 as shown in FIG. 11A, white LEDs 121 are series-connected to a bipolar transistor 124. Red LEDs 122 are parallel-connected to a series circuit that is composed of the white LEDs 121 and the bipolar transistor 124. Furthermore, red LEDs 527 are parallel-connected to the series circuit that is composed of the white LEDs 121 and the bipolar transistor 124.

In the LED module 601 as shown in FIG. 11B, white LEDs 121 are series-connected to a bipolar transistor 124. Red LEDs 122 are parallel-connected to a series circuit that is composed of the white LEDs 121 and the bipolar transistor 124. Furthermore, a series circuit that is composed of red LEDs 627 and a bipolar transistor 628 is parallel-connected to the series circuit that is composed of the white LEDs 121 and the bipolar transistor 124.

3. Positioning of LEDs

In the above embodiments, the two LEDs, which differ in magnitude ratio of current from each other, are parallel-connected to each other. However, the arrangement of LEDs is not limited to this, and alternatively other positioning of LEDs may be used. The following describes LED modules 701 and 708 having another positioning of LEDs with reference to FIG. 12A and FIG. 12B, respectively. The LED modules 701 and 801 basically have the same configuration as the LED module 101 except the following different points.

Figure 12A:
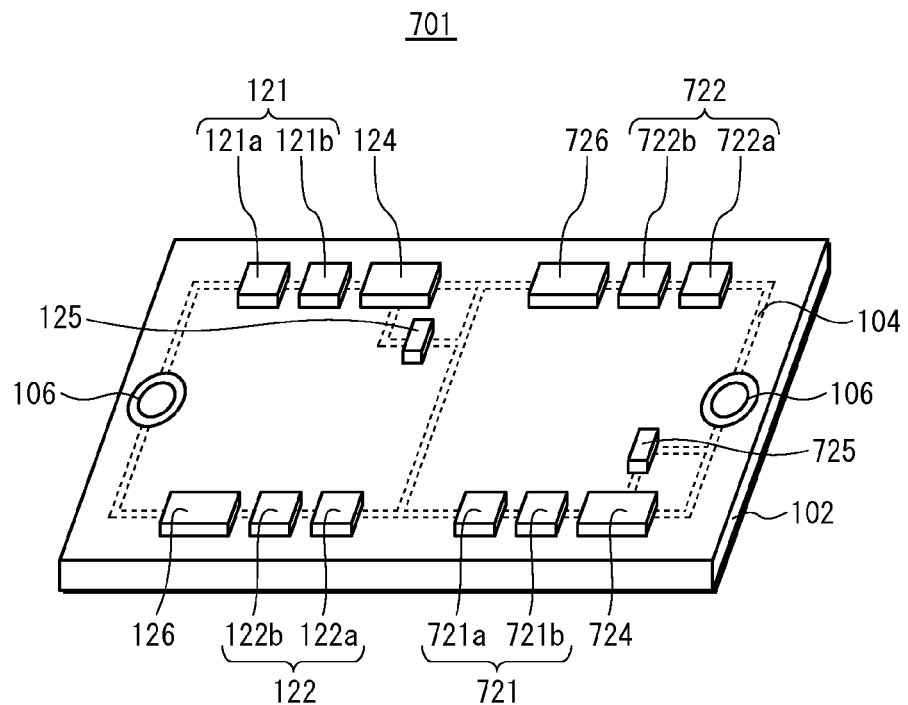
FIG. 12A is a perspective view of an LED module relating to a modification where adjacent two parallel circuits are inverse to each other in terms of positional relationship between white LEDs and red LEDs.

As shown in FIG. 12A, the LED module 701 includes a series circuit that is composed of white LEDs 721a and 721b (hereinafter, referred to collectively as white LEDs 721), a bipolar transistor 724, and a base resistor element 725 and a series circuit that is composed of LEDs 722a and 722b (hereinafter, referred to collectively as red LEDs 722) and a balance resistor element 726, in addition to a series circuit including white LEDs 121 and a series circuit including red LEDs 122 which are the same as those included in the LED module 101.

In the LED module 701, a parallel circuit including the white LEDs 121 is positioned in parallel with a parallel circuit including the white LEDs 721. Also, in the two parallel circuits, the white LEDs 121 are positioned in parallel with the red LEDs 722, and the white LEDs 721 are positioned in parallel with the red LEDs 722. The parallel circuits, which are adjacent to each other, are inverse to each other in terms of positional relationship between the white LEDs and the red LEDs. This suppresses concentration of the luminescent color for each region of the LED module 701, and thereby reduces unevenness in the luminescent color.

Figure 12B:
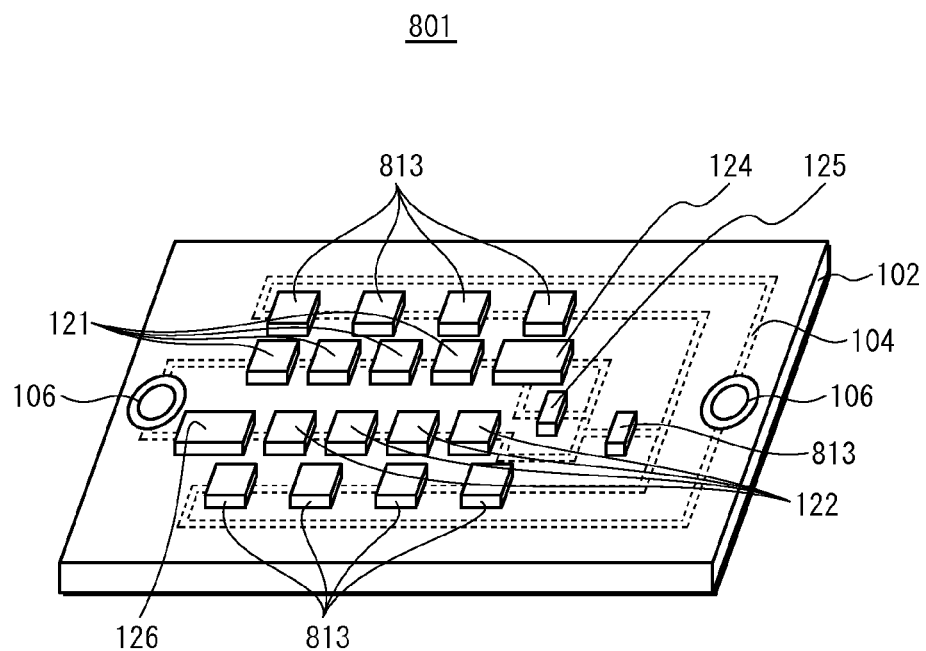
FIG. 12B is a perspective view of an LED module relating to a modification where a plurality of white LEDs that are series-connected to a parallel circuit that is composed of a series circuit including white LEDs and a series circuit including red LEDs.

As shown in FIG. 12B, the LED module 801 includes a plurality of white LEDs 813 so as to sandwich therebetween a series circuit including white LEDs 121 and a series circuit including red LEDs 122, which are the same as those included in the LED module 101. More specifically, the white LEDs 813 are series-connected to a parallel circuit that is composed of the series circuit including the white LEDs 121 and the series circuit including the red LEDs 122. Also, the white LEDs 813 are positioned with a space therebetween. The series circuit including the white LEDs 121 and the series circuit including the red LEDs 122 are arranged in the space between the white LEDs 813. In this way, the white LEDs 121 and the red LEDs 122 are positioned so as to be sandwiched between the white LEDs 813. This suppresses concentration of the luminescent color for each region of the LED module 801, and thereby reduces unevenness in the luminescent color.

4. Modification of Dimming Method

Figure 13:
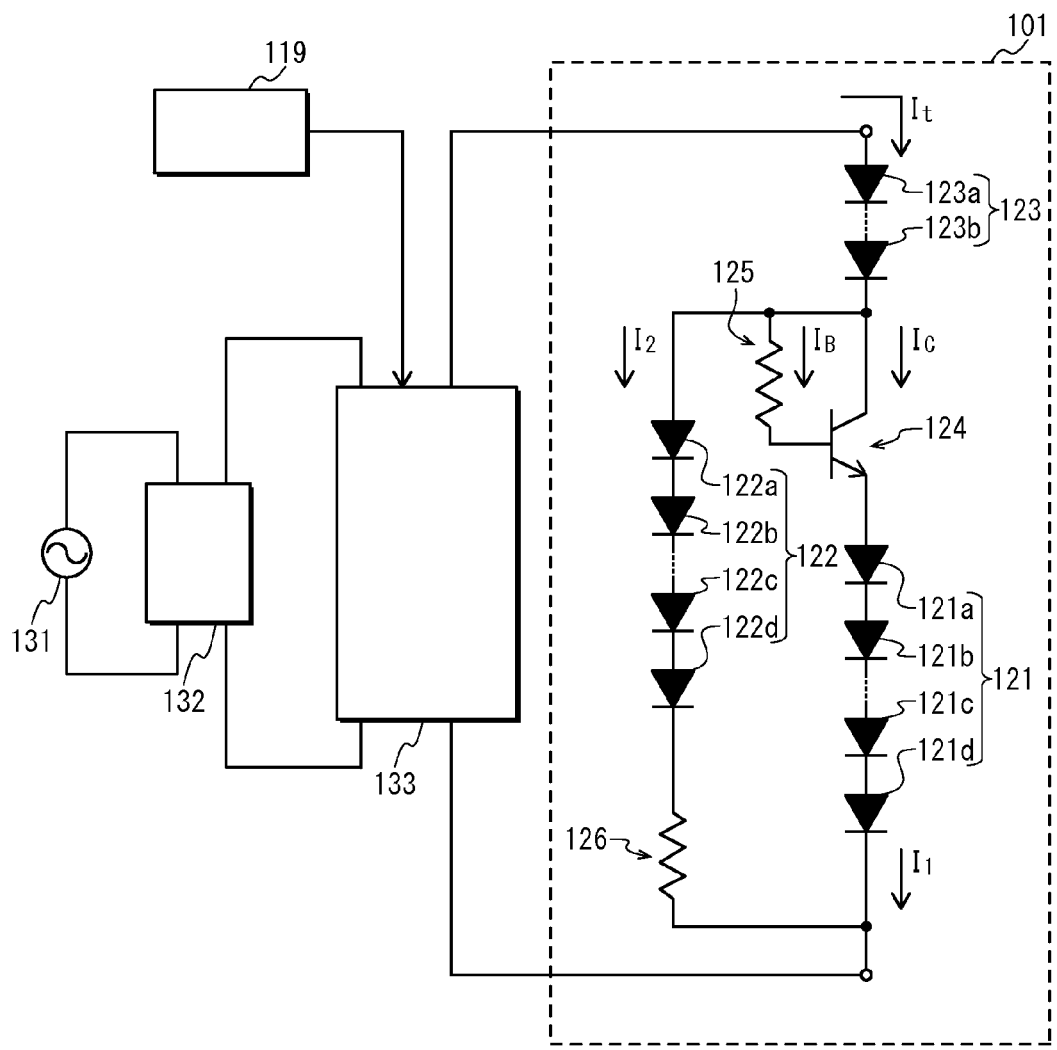
FIG. 13 is a circuit diagram of an LED module relating to a modification.

In the above embodiments, dimming is performed by the dimmer which is provided between the AC power source and the rectifying and smoothing circuit. However, the dimming method is not limited to this. Alternatively, dimming may be performed for example in accordance with a control signal output from a controller. The following describes an LED module to which a dimming method differing from that in the above embodiments and so on is applied, with reference to FIG. 13.

In an LED module 101, a variable current source 133 receives an input of a control signal that is output from a controller 119. The variable current source 133 functions as a control unit for varying magnitude of current $I_t$ output therefrom in accordance with the control signal output from the controller 119 and a current supply unit. The controller 119 is for example a remote controller that is operable by a user, and has a power button and a brightness adjustment button.

5. Application to Illumination Apparatus in which Stepwise Dimming is Performed In the above embodiments and so on, the example is described in which the variable current source includes the IC, and driving the IC causes continuous variation of the magnitude of the current supplied from the variable current source. By the way, there is a known illumination apparatus in which stepwise dimming is performed by a user operating a dimming device or the like that is placed on a wall. The following describes LED modules to which a dimming method differing from that in the above embodiments and so on is applied, with reference to FIG. 14 to FIG. 16B.

Figure 14:
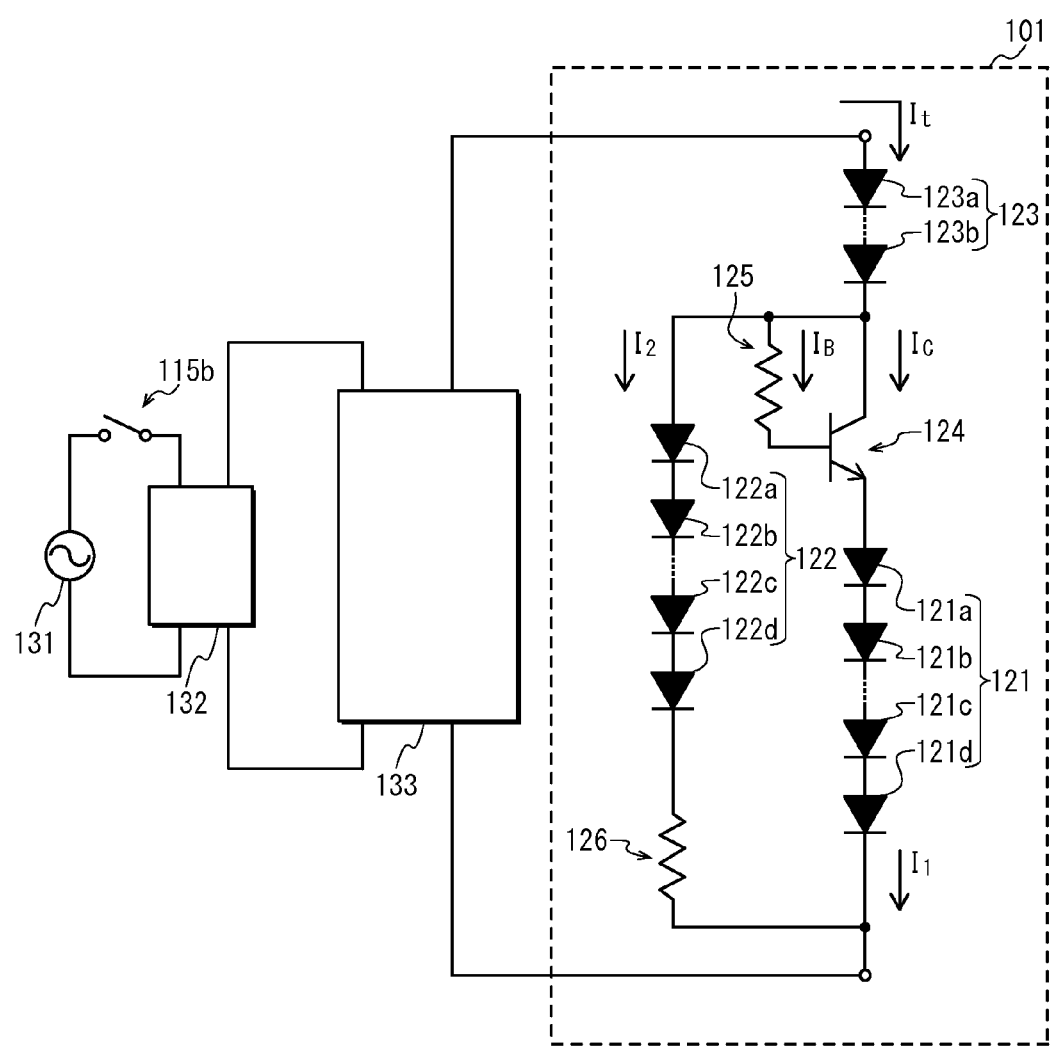
FIG. 14 is a circuit diagram of an LED module relating to a modification.
Figure 15A:
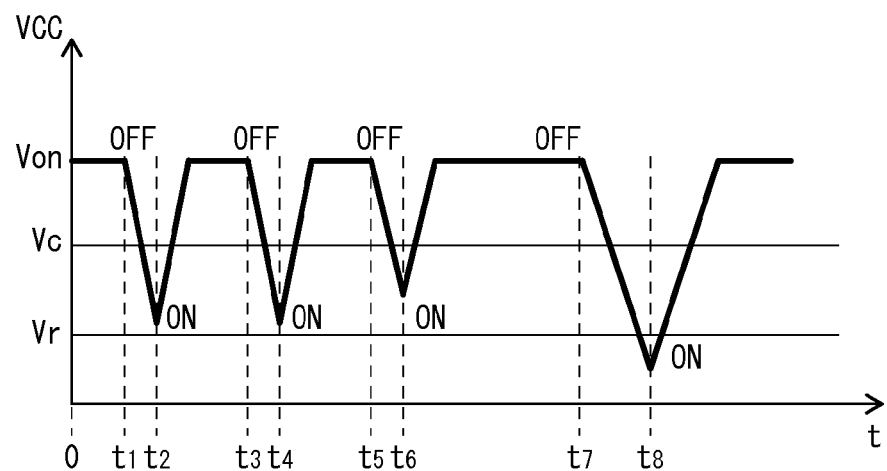
FIG. 15A and FIG. 15B are diagrams for explaining stepwise dimming relating to the modification, where
Figure 15B:
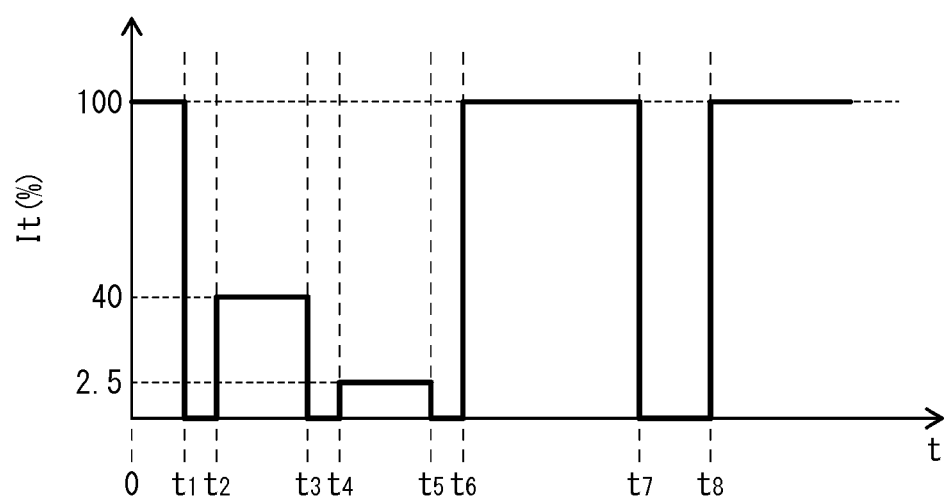
Figure 16A:
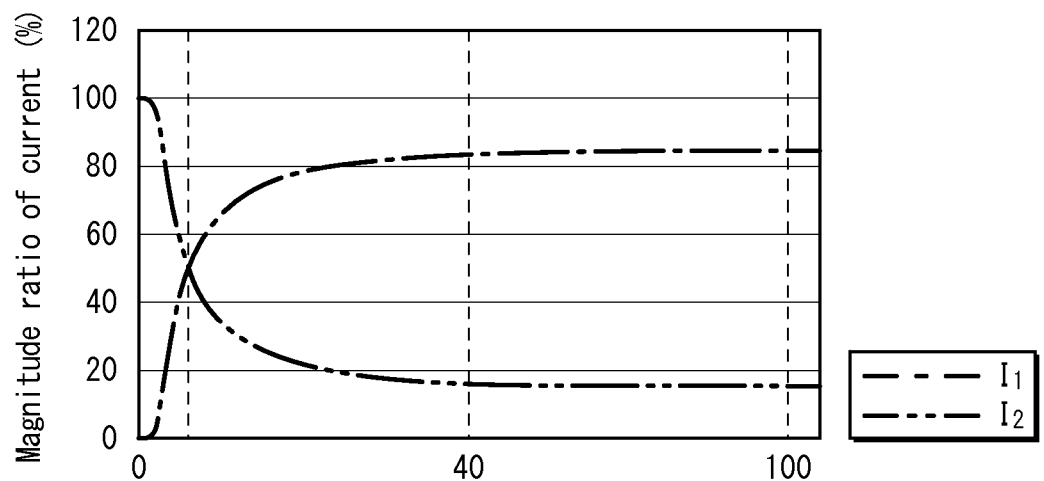
FIG. 16A and FIG. 16B are diagrams for explaining stepwise dimming relating to the modification, where
Figure 16B:
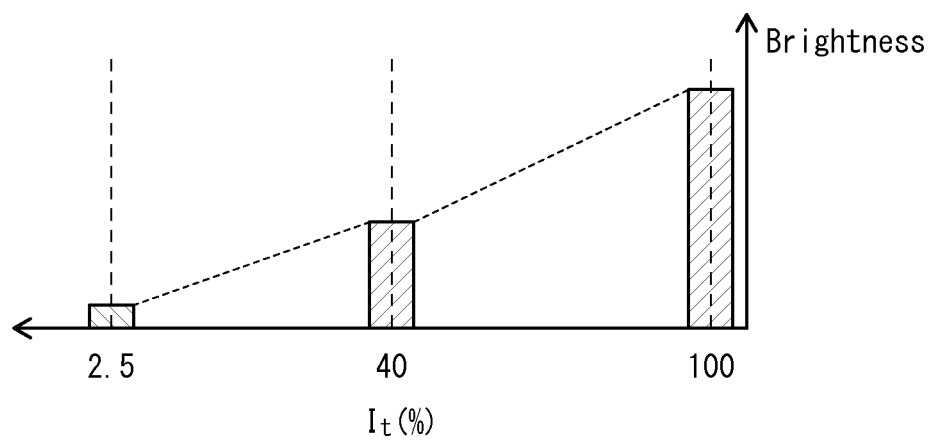
Figure 17:
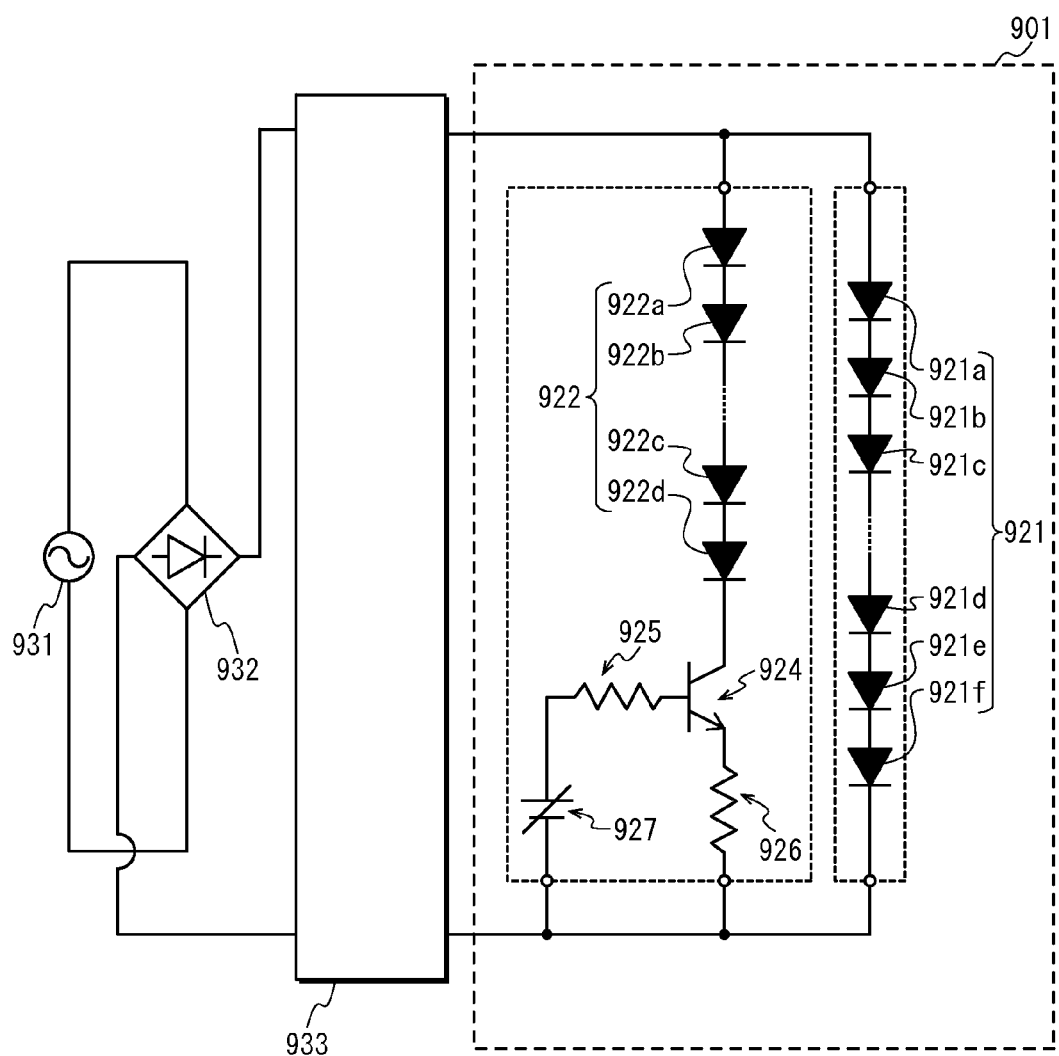
FIG. 17 is a circuit diagram of an LED module relating to a conventional example.

FIG. 14 is a circuit diagram of an LED module relating to a modification. FIG. 15A and FIG. 15B are diagrams for explaining stepwise dimming relating to the modification. FIG. 15A shows variation of voltage VCC output from a voltage regulator, and FIG. 15B shows magnitude of current $I_t$. FIG. 16A and FIG. 16B are diagrams for explaining stepwise dimming relating to the modification. FIG. 16A shows a magnitude ratio of current flowing through the LED module, and FIG. 16B shows brightness of the LED module.

As shown in FIG. 14, the LED module relating to the modification basically has the same configuration as that shown in FIG. 2. The LED module shown in FIG. 14 differs from that shown in FIG. 2 in terms of having a switch 115b between an AC power source 131 and a rectifying and smoothing circuit 132. A dimming operation is performed for example by a user making ON and OFF operations on the switch 115b that is placed on a wall. In the case where the switch 115b is switched between the ON state and OFF state in a short time period, magnitude of voltage output from a voltage regulator included in a variable current source 133 varies stepwisely. As a result, current $I_t$ supplied from the variable current source 133 varies stepwisely, and thereby the LED module is dimmed stepwisely.

FIG. 15A and FIG. 15B show an example of stepwise dimming in which a dimming operation is performed in three steps. In the case where the switch is in the OFF state in a short time period, a stepwise dimming operation is performed. In the case where the switch is in the ON state in a long time period, a reset operation is performed. These operations are specifically described below. In FIG. 15A, Vc represents an output switch threshold, and Vr represents a reset threshold.

(Stepwise Dimming Operation)

Until the time passes from time t0 to time t1, the switch is in the ON state, the output voltage VCC is a constant value Von, and the current $I_t$ of 100% is supplied. This is the first step of the dimming operation. Next, at the time t1, the switch is switched to the OFF state. At time t2, the switch is again switched to the ON state. Here, the output voltage VCC decreases from the constant value Von to the lowest value that is lower than the output switch threshold Vc and higher than the reset threshold Vr, and then again increases. This is the second step of the dimming operation. The supply of the current $I_t$ decreases to 0%, and then increases to 40% with no reset. Next, at time t3, the switch is switched to the OFF state. At time t4, the switch is again switched to the ON state. Here, the output voltage VCC also decreases from the constant value Von to the lowest value, which is lower than the output switch threshold Vc and higher than the reset threshold Vr, and then again increases. This is the third step of the dimming operation. The supply of the current $I_t$ decreases to 0%, and then increases to 2.5% without no reset.

(Reset Operation)

Until the time passes from time t6 to time t7, the switch is the ON state, the output voltage VCC is the constant value Von, and the current $I_t$ of 100% is supplied. Next, at time t7, the switch is switched to the OFF state. At time t8, the switch is again switched to the ON state. Here, the output voltage VCC decreases from the constant value Von to the lowest value, which is lower than the output switch threshold Vc and higher than the reset threshold Vr, and then again increases. The supply of the current $I_t$ decreases to 0%, and then increases to 100% after reset.

(Summary)

In a graph in FIG. 16A, the horizontal axis represents the magnitude of the current $I_t$, and the vertical axis represents a magnitude ratio of the current flowing through each of the current paths to the current $I_t$. In the graph, $I_1$ represents magnitude of current flowing through the white LEDs 121, and $I_2$ represents magnitude of current flowing through the red LEDs 122 shown in FIG. 2.

As shown in FIG. 16A, when the current $I_t$ of lower than 2.5% is supplied, the magnitude of the current $I_1$ flowing through the white LEDs 121 is lower than the magnitude of the current $I_2$ flowing through the red LEDs 122. When the current $I_t$ of 2.5% is supplied, the magnitude of the current $I_1$ flowing through the white LEDs 121 is equal to the magnitude of the current $I_2$ flowing through the red LEDs 122. When the current $I_t$ of higher than 2.5% is supplied, the magnitude of the current $I_1$ flowing through the white LEDs 121 is higher than the magnitude of the current $I_2$ flowing through the red LEDs 122. Note that the magnitude ratio of the current $I_1$ corresponding to supply of the current $I_t$ of 40% is substantially equal to the magnitude ratio of the current $I_1$ corresponding to supply of the current $I_t$ of 100%, and the magnitude ratio of the current $I_2$ corresponding to supply of the current $I_t$ of 40% is substantially equal to the magnitude ratio of the current $I_2$ corresponding to supply of the current $I_t$ of 100%. Accordingly, a luminescent color of light resulting from mixing light emitted from the white LEDs 121 and the red LEDs 122 varies as shown in FIG. 16B. When the current $I_t$ of 2.5% is supplied, the luminescent color is the orange color. When the current $I_t$ of 40% to 100% is supplied, the luminescent color is substantially the white color.

In this way, the current $I_t$ to be supplied is set to micro current such as 2.5% at a point where the current $I_1$ is equal in magnitude ratio to the current $I_2$. This allows to set the same color temperature between supply of the current $I_t$ of 40% and supply of the current $I_t$ of 100%, which differs from the color temperature corresponding to supply of the current $I_t$ of 2.5%. Note that the use of blue LEDs or green LEDs instead of the red LEDs allows to apply the light emitting module relating to the present invention to an illumination apparatus having a so-called night-light function.

6. Application to AC Circuit

In the above embodiments, the current supplied from the variable current source 133 is DC. However, the current to be supplied is not limited to the DC. Alternatively, AC may be supplied from the variable current source 133 by using an element whose impedance varies instead of the variable resistor element. In such a case, each two LEDs need to be series-connected to each other such that a reverse current flows through each of the LEDs.

7. Configuration of LED

In the above embodiments and so on, the white LEDs are each composed of a blue LED chip and a sealing member containing a yellow phosphor, and the red LEDs are each composed of a blue LED chip and a sealing member containing a red phosphor and a green phosphor. However, the configuration of the LEDs is not limited to this. Alternatively, the white LEDs each may be composed of a blue LED chip and a sealing member containing a yellow phosphor, and the red LEDs each may be composed of only a red LED chip.

8. Application Example of LED Module to Illumination Apparatus

In the above embodiments, the LED module is applied to a bulb type lamp. However, application of the LED module is not limited to this. Alternatively, the LED module may be for example applicable to a ceiling light, a halogen lamp, and the like.

9. Others

The materials, numerical values, and so on described in the above embodiments are just preferable examples, and accordingly the present invention is not limited by the above embodiments. Also, the present invention may be appropriately modified without departing from the scope of the technical ideas of the present invention. Furthermore, the above embodiments may be combined with another embodiment as long as consistency is maintained. Moreover, scale reduction of members shown in the drawings differ from the actual scale reduction. Also, the numerical ranges are intended to include the endpoints.

INDUSTRIAL APPLICABILITY

The circuit relating to the present invention is for example usable to an illumination apparatus having a dimming function alternative to a incandescent bulb.

REFERENCE SIGNS LIST

101 LED module
121, 123 white LED
122 red LED
124 bipolar transistor
125 base resistor element
126 balance resistor element
133 variable current source

The invention claimed is:

1. A light-emitting circuit that receives current supplied from a variable current source, the light-emitting circuit comprising:
a first light-emitting element having a first anode and a first cathode;
an NPN bipolar transistor that is series-connected to the first light-emitting element, and has a base terminal, a collector terminal, and an emitter terminal; and
a second light-emitting element having a second anode and a second cathode that is parallel-connected to a series circuit composed of the first light-emitting element and the NPN bipolar transistor, and which differs in luminescent color from the first light-emitting element, wherein
the collector terminal is connected to the variable current source,
the emitter terminal is connected to the first anode,
the second anode is connected to the collector terminal,
the second cathode is connected to the first cathode,
one of two terminals of a fixed resistor element is directly connected to the base terminal,
the other terminal of the fixed resistor element is directly connected to the collector terminal, and
the resistance of the NPN bipolar transistor varies in accordance with variation of a magnitude of current flowing through the base terminal via the fixed resistor element depending on the magnitude of the current supplied from the variable current source.

2. The light-emitting circuit of claim 1, wherein
the first light-emitting element emits light that is higher in color temperature than light emitted by the second light-emitting element, and
the resistance of the NPN bipolar transistor increases in accordance with decrease of the magnitude of the current supplied from the variable current source.

3. The light-emitting circuit of claim 1, further comprising another fixed resistor element connected between the first cathode and the second cathode, wherein
the first light-emitting element and the second light emitting element comprise equal numbers of semiconductor light emitting devices.

4. The light-emitting circuit of claim 1, further comprising another fixed resistor element connected between the first cathode and the second cathode, wherein
the first light-emitting element and the second light emitting element comprise different numbers of semiconductor light emitting devices.

5. The light-emitting circuit of claim 1, wherein
the series circuit is connected to the second light-emitting element via another resistor element connected between the first cathode and the second cathode.

6. A light-emitting module that includes a substrate and a light-emitting circuit provided on the substrate, and receives current supplied from a variable current source, the light-emitting circuit comprising:
a first light-emitting element having a first anode and a first cathode;
an NPN bipolar transistor that is series-connected to the first light-emitting element, and has a base terminal, a collector terminal, and an emitter terminal; and
a second light-emitting element having a second anode and a second cathode that is parallel-connected to a series circuit composed of the first light-emitting element and the NPN bipolar transistor, and which differs in luminescent color from the first light-emitting element, wherein
the collector terminal is connected to the variable current source,
the emitter terminal is connected to the first anode,
the second anode is connected to the collector terminal,
the second cathode is connected to the first cathode,
one of two terminals of a fixed resistor element is directly connected to the base terminal,
the other terminal of the fixed resistor element is directly connected to the collector terminal, and
the resistance of the NPN bipolar transistor varies in accordance with variation of a magnitude of current flowing through the base terminal via the fixed resistor element depending on the magnitude of the current supplied from the variable current source.

7. The light-emitting circuit of claim 6, wherein
the first light-emitting element emits light that is higher in color temperature than light emitted by the second light-emitting element, and
the resistance of the NPN bipolar transistor increases in accordance with decrease of the magnitude of the current supplied from the variable current source.

8. The light-emitting circuit of claim 6, further comprising another fixed resistor element connected between the first cathode and the second cathode, wherein
the first light-emitting element and the second light-emitting element comprise equal numbers of semiconductor light emitting devices.

9. The light-emitting circuit of claim 6, further comprising another fixed resistor element connected between the first cathode and the second cathode, wherein
the first light-emitting element and the second light emitting element comprise different numbers of semiconductor light emitting devices.

10. The light-emitting circuit of claim 6, wherein
the series circuit is connected to the second light-emitting element via another resistor element connected between the first cathode and the second cathode.

11. An illumination apparatus comprising the light-emitting module of claim 6; and
a connecting part for connecting the light-emitting module to an external power source.

* * * * *